(12) United States Patent
Johnson et al.

(10) Patent No.: US 6,219,099 B1
(45) Date of Patent: Apr. 17, 2001

(54) METHOD AND APPARATUS FOR CALIBRATING A DISPLAY USING AN ARRAY OF CAMERAS

(75) Inventors: Michael J. Johnson; Chung-Jen Chen; Rajesh Chandrasekhar, all of Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/159,024

(22) Filed: Sep. 23, 1998

(51) Int. Cl.[7] .................................. H04N 5/66; H04N 9/12

(52) U.S. Cl. ........................... 348/383; 745/778; 745/189

(58) Field of Search ............................... 348/383, 36, 607, 348/189, 180, 744–747, 756, 726, 778, 781, 785; 345/1, 4

(56) References Cited

U.S. PATENT DOCUMENTS

| | | | |
|---|---|---|---|
| 3,833,764 | 9/1974 | Taylor | 178/7.5 D |
| 4,103,435 | 8/1978 | Herndon | 35/12 N |
| 4,974,073 | 11/1990 | Inova | 358/87 |
| 5,136,390 | 8/1992 | Inova et al. | 358/231 |
| 5,216,504 | 6/1993 | Webb et al. | 358/139 |
| 5,231,481 | 7/1993 | Eouzan et al. | 358/60 |
| 5,396,237 | * 3/1995 | Someya et al. | 345/7 |
| 5,475,447 | 12/1995 | Funado . | |
| 5,543,870 | 8/1996 | Blanchard | 353/74 |
| 5,555,035 | 9/1996 | Mead et al. . | |
| 5,626,410 | 5/1997 | Chambergs et al. | 353/94 |

(List continued on next page.)

FOREIGN PATENT DOCUMENTS

| | | |
|---|---|---|
| 0739131 | 10/1996 | (EP) . |
| 2660090 | 9/1991 | (FR) . |

OTHER PUBLICATIONS

Patent Abstracts of Japan, vol. 1996, No.01, Jan. 31, 1996 & JP 07 239504 A (Mitsubishi Heavy Ind Ltd), Sep. 12, 1995 abstracts.

Patent Abstracts of Japan, vol. 1996, No. 09, Sep. 30, 1996 & JP 08 126018 A (Hitachi Ltd), May 17, 1996 abstracts.

Patent Abstracts of Japan, vol. 1995, No.06, Jul. 31, 1995 & JP 07 064522 A (Hitachi Ltd), Mar. 10, 1995 abstract.

Bergstedt, Robert et al., "Microlaser–based Displays," *SPIE*, vol. 3057, (1997) pp. 362–367.

Collins, Robert T. et al., "Matching Perspective Views of Coplanar Structures using Projective Unwarping and Similarity Matching," IEEE Conference on Computer Vision and Pattern Recognition, Jun. 1993, 10 pages.

(List continued on next page.)

Primary Examiner—Victor R. Kostak
(74) Attorney, Agent, or Firm—John G. Shudy, Jr.

(57) ABSTRACT

The present invention overcomes many of the disadvantages of the prior art by providing a display that can be calibrated and re-calibrated with a minimal amount of manual intervention. To accomplish this, the present invention provides one or more cameras to capture an image that is projected on a display screen. In one embodiment, the one or more cameras are placed on the same side of the screen as the projectors. In another embodiment, an array of cameras is provided on either or both sides of the screen for capturing a number of adjacent and/or overlapping capture images of the screen. In either of these embodiments, the resulting capture images are processed to identify any non-desirable characteristics including any visible artifacts such as seams, bands, rings, etc. Once the non-desirable characteristics are identified, an appropriate transformation function is determined. The transformation function is used to pre-warp the input video signal to the display such that the non-desirable characteristics are reduced or eliminated from the display. The transformation function preferably compensates for spatial non-uniformity, color non-uniformity, luminance non-uniformity, and/or other visible artifacts.

30 Claims, 18 Drawing Sheets

U.S. PATENT DOCUMENTS

| | | | |
|---|---|---|---|
| 5,657,073 | | 8/1997 | Henley .................................... 348/38 |
| 5,661,531 | | 8/1997 | Greene et al. ......................... 349/73 |
| 5,668,569 | | 9/1997 | Greene et al. ....................... 345/103 |
| 5,737,038 | | 4/1998 | Gale et al. ........................... 348/759 |
| 5,793,441 | | 8/1998 | Hagerman . |
| 5,796,425 | * | 8/1998 | Minama et al. ..................... 348/181 |
| 5,838,396 | * | 11/1998 | Shiota et al. ........................ 348/745 |
| 6,018,361 | * | 1/2000 | Fujii et al. .......................... 348/180 |

OTHER PUBLICATIONS

Cruz–Neira, Carolina et al., "Surround–Screen Projection–Based Virtual Reality: The Design and Implementation of the CAVE," SIGGRAPH 93, Computer Graphics Proceedings, Annual Conference Series, (1993), pp. 135–142.

Czernuszenko, Marek et al., "The ImmersaDesk and Infinity Wall Projection–Based Virtual Reality Displays," *Computer Graphics*, May 1997, pp. 46–49.

Freeman, K.G., "A Multi–Standard High–Definition Television Projector," *The Journal of the Institution of Electronic and Radio Engineers*, vol. 55, No. 2, Feb. 1985, pp. 47–53.

Fuchs, Henry et al., "Virtual Space Teleconferencing using a Sea of Cameras," 7 pages.

Gonzalez, Rafael C. et al., *Digital Imaging Processing*, 2nd Edition, pp. 246–251.

Holmes, Richard E., "Videorama™—A New Concept in Juxtaposed Large Screen Displays," *SPIE*, vol. 1081, (1989) pp. 15–20.

Ishii Hiroshi et al., "Iterative Design of Seamless Collaboration Media," *Communications of the ACM*, vol. 37, No. 8, Aug. 1994, 16 pages.

Iwata et al., "A Seamless Multiscreen Display," *Mitsubishi Denki Giho*, vol. 71, No. 2 (1997), pp. 80–83 (with English translation attached).

Lin, Chun–Chuan et al., "Performance Measurement of Projection Display," *SPIE*, vol. 2892, (1996) pp. 148–153.

Mayer, Theo., "Design Considerations and Applications for Innovative Display Options Using Projector Arrays," *SPIE*, vol. 2650, (1996) pp. 131–139.

Raslar. Ramesh et al., "Efficient Image Generation for Multiprojector and Multisurface Displays," Department of Computer Science, University of North Carolina, (1998) 12 pages.

Raskar, Ramesh et al., "The Office of the Future: A unified Approach to Image–Based Modeling and Spatially Immersive Displays," *SIGGRAPH 98*, Computer Graphics Proceedings, Annual Conference Series, (1998) pp. 1–10.

Tsai, Roger Y., "An Efficient and Accurate Camera Calibration Technique for 3D Machine Vision," *Proceedings CVPR '86*, IEEE Computer Society, (1986) pp. 364–374.

Wang, K.C. et al., "Assessment of Metal Halide Lamp for the Illumination of LCD–Based Projection Display," *SPIE*, vol. 2407, (1995) pp. 36–46.

Wolberg, George, *Digital Image Warping*, IEEE Computer Society Press Monograph, pp. 50–51.

Pamphlet, *MIMiCAM™ Automated Monitor Alignment & Inspection System*, Display Laboratories, Inc., (1994) 6 pages.

* cited by examiner

METHOD AND APPARATUS FOR CALIBRATING A DISPLAY USING AN ARRAY OF CAMERAS

CROSS REFERENCE TO CO-PENDING APPLICATIONS

The present application is related to U.S. patent application Ser. No. 09/159,340 filed Sep. 23, 1998, entitled "METHOD AND APPARATUS FOR PROVIDING A SEAMLESS TILED DISPLAY"; and U.S. patent application Ser. No. 09/158,995 filed Sep. 23, 1998, entitled "METHOD AND APPARATUS FOR CALIBRATING A TILED DISPLAY", both of which are assigned to the assignee of the present invention and incorporated herein by reference.

The invention described herein was made in the performance of work under NASA Contract NAS1-20219 and is subject to the provisions of Section 305 of the National Aeronautics and Space Act of 1958, as amended (42 USC 2457).

BACKGROUND OF THE INVENTION

This invention relates to calibrating displays, and more particularly, to calibrating tiled displays that use multiple display devices to produce larger and/or higher resolution images.

Tiled display systems, and in particular tiled projection systems, have been proposed and used for many years. In the 1950s, the "CINERAMA" system was developed for the film industry. The CINERAMA system projected three films using three separate projection displays, which were combined to form a single panoramic image. Disneyland continues to use a similar multiple projector system. At Disneyland, a circle of projectors shine onto a screen that circles the wall of a round room.

In the video field, multiple projector systems have been proposed and used for a number of specialty applications. For example, U.S. Pat. No. 4,103,435 to Herndon and U.S. Pat. No. 3,833,764 to Taylor suggest using multiple projector systems for flight simulators. In many of these systems, multiple video screens are placed next to each other to form a large image display for multiple projectors. A difficulty with many of the video based multiple projector display systems is making the multiple images appear as one single continuous image on the display screen.

When two images are projected side-by-side on a single screen, there is normally a seam between the images. The final display image will either appear as two images placed side-by-side with a gap in between or, if the images are made to overlap on a single screen, there will be a bright line where the two images overlap. Because of the inconsistencies in conventional cameras, video processing and delivery channels in displays and, specifically, projection displays, it is exceedingly difficult to perfectly match the resultant video images so that no tiling artifacts appear among the images. If the images are brought very close together on the same screen, there is typically both gaps and overlaps at each seam.

The article entitled *Design Considerations and Applications for Innovative Display Options Using Projector Arrays*, by Theo Mayer, SPIE Vol. 2650 (1996), pp. 131–139, discloses projecting a number of discrete images in an overlapping relation and ramping the brightness of the discrete images in the overlapping regions of each image. Mayer discloses using a blending function to fade down each overlapping edge of the discrete images in such a way so as to compensate for the gamma (video signal reduction vs. light output curve) of a phosphor, light valve or LCD projector, with the goal of producing a uniform brightness across the display.

U.S. Pat. No. 5,136,390 to Inova et al. recognizes that the blending function typically cannot be a simple even ramping function. A typical video projector produces an image that becomes darker toward the edges of the image as a natural function of the lens system used, and has a number of bright and dark portions caused by normal irregularities in the signal, intermediate signal processor, projector, screen, etc. These inconsistencies typically vary from one video component to another, and even among different components with similar construction. Also, different types of projectors often respond differently to the same amount of brightness modification. Thus, a simple ramp of the brightness in the over-lapping regions can produced light and dark bands and/or spots in the resulting image.

To overcome these limitations, Inova et al. suggest applying a simple even blending function to the overlapping regions of the image, as suggested by Mayer, but then manually tuning the simple even blending function at specific locations to remove the visible artifacts from the display. The location of each artifact is identified by manually moving a cursor over each location that is identified as having an artifact. Once the cursor is in place, the system tunes the corresponding location of the blending function so that the corresponding artifacts are removed.

Since each artifact must be manually identified by a user, the process of calibrating an entire display can be time-consuming and tedious. This is particularly true since many displays require periodic re-calibration because the performance of their projectors and/or other hardware elements tend to change over time. In view of the foregoing, it would be desirable to have a display that can be calibrated and re-calibrated with less manual intervention than is required by Inova et al and others.

SUMMARY OF THE INVENTION

The present invention overcomes many of the disadvantages of the prior art by providing a display that can be calibrated and re-calibrated with little or no manual intervention. To accomplish this, the present invention provides one or more cameras for capturing an image that is shown on a display viewing surface or viewing screen. In one illustrative embodiment, the one or more cameras are placed on the viewing side of the displays. In another illustrative embodiment, the one or more cameras are place on the non-viewing side of the displays, for example between the backlight and an adjoining LCD or on the inside and rear of the vacuum bottle in the case of a CRT.

In one illustrative embodiment, the one or more cameras are placed on the same side of the screen as the projection display. In another illustrative embodiment, an array of cameras is provided on either or both sides of the screen for capturing a number of adjacent and/or overlapping capture images of the screen. In any case, the resulting capture images are processed to identify any non-desirable characteristics therein including any visible artifacts such as seams, bands, rings, etc. Once the non-desirable characteristics are identified, an appropriate transformation function is determined. The transformation function is used to pre-warp the input video signal to the display such that the non-desirable characteristics are reduced or eliminated from the display. The transformation function preferably compensates for spatial non-uniformity, color non-uniformity, luminance non-uniformity, and/or other visible artifacts.

In one illustrative embodiment, a screen is provided that has a first side and a second side. For a rear projection display, the first side may correspond to the projection side, and the second side may correspond to the viewing side. For a front projection display, the first side may correspond to both the projection and viewing side of the screen. In one illustrative embodiment, a projector is provided for projecting an image onto the projection side of the screen, and a camera or camera array is provided for capturing a capture image or capture image segment from the projection side of the screen. A determining block is provided for receiving the capture image(s), and determining if the capture image(s) has one or more non-desirable characteristic. An identifying block may also be provided for identifying a transformation function that can pre-warp the input video signal such that the non-desirable characteristics are reduced or eliminated from the composite display.

It is contemplated that two or more displays and, specifically projectors, may be provided, wherein each of the displays manifests a discrete image so that the discrete images collectively form a composite image on the screen. It is also contemplated that two or more cameras may be provided. When two or more cameras are provided, it is contemplated that the cameras may be provided on either or both sides of the screen, and may capture a number of adjacent and/or overlapping capture images of the screen. Preferably, each of the cameras is paired with one of the displays, thereby forming a number of display/camera clusters. Each of the display/camera clusters preferably include a number of electromechanical interfaces for providing interfaces with neighboring display/camera clusters, and allowing the joinder of two or more clusters to form an overall display.

It is contemplated that when more than one display is provided, the identifying block may identify a separate transformation function for each display, and may further augment the transformation for each display into one that is a composite transformation function for the whole of the tiled display. By providing a transformation function for each display separately and preferably in conjunction with the constraints for the whole display, the various non-desirable characteristics may be more easily removed from the composite image.

It is also contemplated that the identifying block may analyze the capture images provided by several cameras when identifying a transformation function for a particular display. For example, to identify a transformation function that removes the luminance non-uniformity from a particular display, the identifying block may analyze the brightness of all capture images of the display to determine an appropriate floor and/or ceiling brightness level, as more fully described below.

Finally, it is contemplated that each of the display/camera clusters may include a processing module for implementing at least part of the determining, identifying and/or processing functions described above. Accordingly, it is contemplated that the processing hardware of the display may be at least partially distributed among the display/camera clusters. In one implementation, the camera, the display, the electrical I/O function and the processing functions, described below, are embedded on the same substrate.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention provides a display that can be calibrated and re-calibrated with no to a minimal amount of manual intervention. To accomplish this, the present invention provides one or more cameras to capture an image that is projected on a display viewing surface or viewing screen. In one illustrative embodiment, the one or more cameras are placed on the viewing side of the displays. In another illustrative embodiment, one or more cameras are place on the non-viewing side of the displays for example between the backlight and an adjoining LCD or on the inside and rear of the vacuum bottle in the case of a CRT. In one embodiment, the one or more cameras are placed on the same side of the screen as the projection displays. In another embodiment, an array of cameras is provided on either or both sides of the screen for capturing a number of adjacent and/or overlapping capture images of the screen. In any of the embodiments, the resulting capture images are processed to identify any non-desirable characteristics including any visible artifacts such as seams, bands, rings, etc. Once the non-desirable characteristics are identified, an appropriate transformation function is determined. The transformation function is used to pre-warp the input video signal to the display such that the non-desirable characteristics are reduced or eliminated from the display. The transformation function preferably compensates for spatial non-uniformity, color non-uniformity, luminance non-uniformity, and/or other visible artifacts.

Figure 1:
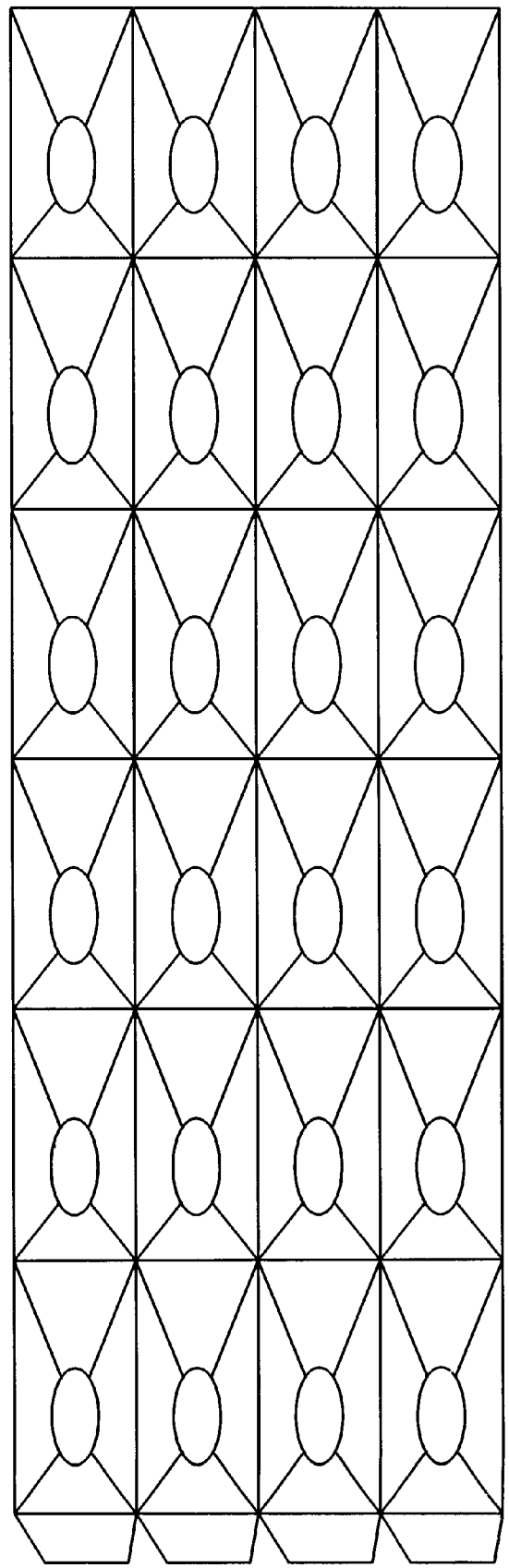
FIG. 1 is a perspective view of a four-by-six array of projectors.

In one illustrative embodiment, a tiled display is provided that has two or more projectors arranged in an array configuration. The projectors may be direct write (e.g. CRT, LCD, DMD, CMOS-LCD) or any other type of imaging device, and may be front and rear projection types. In a tiled type display, each of the displays preferably manifests a discrete image separately onto a viewing surface or screen, wherein the discrete images collectively form a composite image. The discrete images may or may not overlap one another. Such a configuration is shown in FIG. 1.

Figure 2:
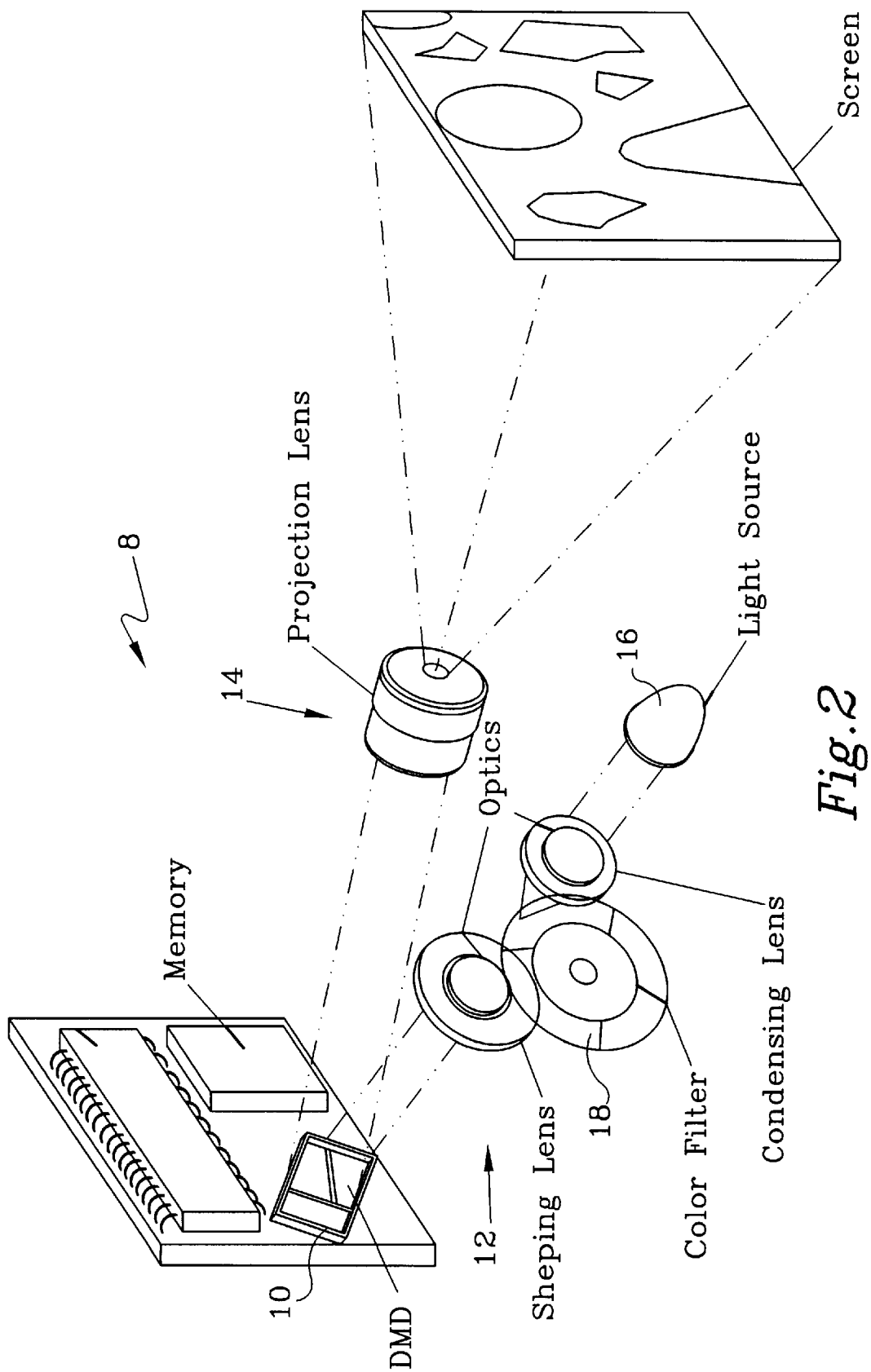
FIG. 2 is a perspective view of one illustrative projector of FIG. 1.

An illustrative projector 8 is shown in FIG. 2, and preferably uses one Digital Micromirror Device (DMD) 10. DMD devices typically include an array of electronically addressable, movable square mirrors that can be electrostatically deflected to reflect light. The use of a DMD device can provide a lightweight, reliable, digital display with a wide viewing angle and good picture clarity. Further, some DMD devices meet various MIL-STD-810 environmental and stress requirements, and can display color, graphic, text and video data at various frame rates.

The projector 8 also preferably includes various optical elements to properly prepare the incoming illuminations, illuminate the DMD 10, and project the outgoing image. As shown in FIG. 2, the optical path may include two segments: the illumination path 12 and the projection path 14. The optical path may start with a high-reliability, metal halide, short-arc lamp 16 that illuminates the DMD 10. The light from the arc lamp 16 passes through a rotating RGB color filter wheel 18. An illumination relay lens magnifies the beam to illuminate the DMD 10 and form a telecentric image at the DMD 10. A Total Internal Reflection (TIR) prism 20 enables the incoming light from the lamp to pass onto the DMD 10, and back into the projection optics. Depending on the rotational state (e.g. ±10 degrees for on/off) of each mirror on the DMD, the light from the DMD 10 is directed into the pupil of the projection lens (on) or away from the pupil of the projection lens (off). A multiple-element projection cell magnifies the image coming off the DMD 10, at the desired MTF, lateral color, and distortion.

Each projector 8 may also include an electronics module (not explicitly shown). The electronics module may take the incoming data signals, convert the temporal signals into spatial representations on the DMD 10, and control the filter 18 that provides the sequential color for the display. As described below, the electronics may be modular, allowing an arbitrary number of projectors to be tiled together. Further, tiling algorithms may be incorporated into the electronics, as appropriate, to enable "smart" projectors. This may allow the electronics of each projector to automatically or manually adapt to an arbitrary configuration of projectors, with little or no manual intervention by the user.

Figure 3:
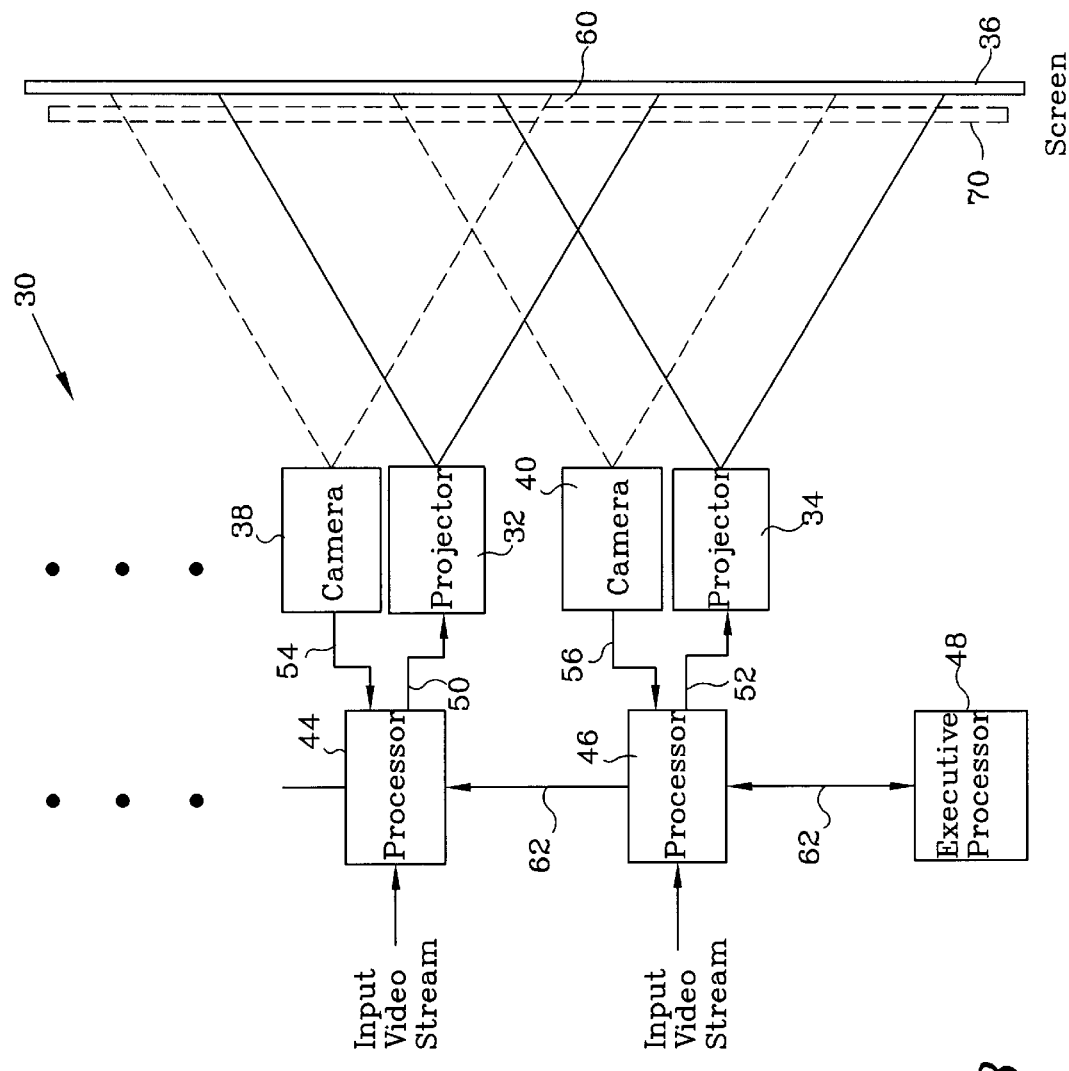
FIG. 3 is a block diagram of an illustrative embodiment of the present invention.

FIG. 3 is a schematic diagram of an illustrative embodiment of the present invention. The system is generally shown at 30, and may include one or more displays which may be projectors 32 and 34 for manifesting a number of discrete images on a viewing surface or screen 36. For the purpose of illustration, the display will be discussed as a projector. One or more cameras 38 and 40 may also be provided to capture an image that is projected onto the screen 36. In one illustrative embodiment, the one or more cameras 38 and 40 are placed on the same side of the screen 36 as the projectors 32 and 34. In another illustrative embodiment, an array of cameras are provided on either or both sides of the screen for capturing a number of adjacent and/or overlapping capture images of the screen 36. In a more general illustrative embodiment, the one or more cameras are placed on the viewing side of the displays. In another illustrative embodiment, the one or more cameras are place on the non-viewing side of the displays, for example between the backlight and an adjoining LCD or on the inside and rear of the vacuum bottle in the case of a CRT. In any case, a determining block may determine if the capture images have any undesirable characteristics, and an identifying block may identify a transformation function that, when applied to the input video signal, may reduce the undesirable characteristics. The determining block and identifying block may be implemented using one or more processors.

In the illustrative embodiment, each camera/projector pair or cluster may include a corresponding processor or the like. For example, projector 32 and camera 38 have a corresponding processor 44, and projector 34 and camera 40 have a corresponding processor 46. In one illustrative embodiment, the local processors 44 and 46 are coupled to an Executive Processor 48 via an interface 62.

Each of the local processors 44 and 46 receive an input video stream, as shown. Because each of the projectors 32 and 34 typically project only a portion of the desired composite image, the processors 44 and 46 may segment the input video stream into a first input video signal 50 and a second input video signal 52, each of which may be processed further as described below to compensate for artifacts and to accomplish high image quality in the composite image. In the illustrative embodiment, the processors 44 and 46 segment the input video stream so that any overlaps between adjacent discrete images, for example overlap 60, are taken into account.

The input video stream may be provided from any number of sources, and may be a NTSC, PAL, HDTV, workstation or PC video signal. These signal types are compatible with the RS-170, RS-343 guidelines and specifications, for example, or more recently, the VESA video signal standards and guidelines. The signals may include horizontal and vertical sync, and blanking information in addition to the active video signal used to build the output image. The sync signals may be used by the processors 44 and 46 to derive a system and/or video-sampling clock, especially in the case of an analog input signal that needs to be digitized.

Cameras 38 and 40 are preferably directed at the screen 58 as shown, with each providing a camera output signal to the corresponding processor 44 and 46 via interfaces 54 and 56, respectively. The cameras 38 and 40 may have a field-of-view that is sufficient to capture a capture image of at least a portion of the composite image. It is contemplated that the field-of-view of each camera may encompass only 1% of the composite image, 50% of the composite image, the entire composite image, or any other portion of the composite image that is deemed desirable. In a tiled display, this may correspond to only a portion of one tile, about one tile, more than one tile, or all of the tiles. When the field-of-view of the cameras do not encompass the entire display, it may be necessary to calibrate each section of the display separately, and then assemble the results in a background or real-time mode to achieve a calibrated display over all the tiles.

With an array of cameras, as shown, the field-of-view of each camera does not necessarily have to correspond to the field-of-view of the corresponding projector. In the illustrative embodiment, the field-of-view of camera 38 is offset in an upward direction, for example, relative to the field-of-view of the projector 32. The field of view of the camera may be rotated, scaled or translated relative to the orientation of the displayed image tile. Likewise, the field-of-view of camera 40 is offset in an upward direction relative to the field-of-view of the projector 34. This is acceptable because the cameras of neighboring Processor-Camera-Projector clusters may be used to capture the remaining or missing scene content in a daisy-chain manner. The result may be analyzed using any of many known methods for auto- and cross-correlating extracted features. The neighboring cluster may relay the remainder or missing scene content back to the appropriate processor via the Executive Processor 48. The Executive Processor 48 preferably assembles a composite from the multitude of images provided thereto, and provides the appropriate composite information to each local processor. The composite may be expressed as an image, image features, data or any other form of information and relay it back to the appropriate processor via interface 62. It is also contemplated that the bore-sight of the cameras need not lie orthogonal to the screen 36. Rather, the cameras may be angled vertically and/or horizontally (not shown) to encompass more or less of the projected image.

Once the appropriate information is relayed back to each local processor, the non-desirable characteristics may be determined. An identifying block, preferably located within each local processor, may then identify a transformation function, that when applied to the input video stream, reduces the non-desirable characteristics in the corresponding Processor-Camera-Projector cluster, and thus in the composite image on the screen 36. The non-desirable characteristics may include spatial non-uniformity, color non-uniformity, and/or luminance non-uniformity, but may also include other known image artifacts or irregularities.

In the embodiment shown, the screen 36 may be a transmissive screen or a reflective screen. If the screen 36 is transmissive, then the embodiment shown is a rear projection display. If the screen 36 is reflective, then the embodiment shown is a front projection display. In either case, the camera and projectors are shown on the same side of the screen, namely, the projection side. It is contemplated, however, that when an array of cameras is provided, the cameras may be placed on either or both sides of the screen relative to the projectors, which again, are an example of displays more generally contemplated.

The cameras may be still or video electronic cameras, or have an equivalent combination of components that capture the scene in a multi-point manner and deliver an electronic representation of the image to the corresponding local processor. In the preferred embodiment, the cameras are CCD or CMOS cameras, either color (e.g. multi-point colorimeter) or monochrome. The cameras preferably include a photopic filter to enable the cameras to measure the output image in a manner that is consistent with the human visual system. Thus, noise and errors in luminance and chromaticity are measured in a way that is similar to how the eye detects such anomalies. The images may be snapshots taken over a brief moment (e.g. less than 60 milliseconds), or over a longer exposure time (e.g. on the order of one second).

In a preferred embodiment, the cameras are conventional miniature video cameras that produce an analog output. The analog output is digitized and captured by a frame grabber or the like (not shown) located in each of the local processors 44 and 46. Once digitized, the capture images are stored and processed using digital processing techniques. To determine if the capture image has any non-desirable characteristics, the capture image may be compared to a predetermined data or information set. First, however, it is contemplated that the distortion introduced by the cameras and associated processing hardware may be determined and removed.

To isolate the camera distortion, it is contemplated that a physical template 70 may be provided in front of the screen 36, as shown. The physical template 70 preferably includes a predetermined pattern thereon, such as an array of dots. With the physical template 70 in place, the cameras 38 and 40 may each capture a capture image of at least a portion of the physical template 70 including a portion of the predetermined pattern. By comparing the capture images with predetermined expected images, and in particular, comparing the location of the dots of the predetermined pattern in the capture images to the expected locations of each of the dots, the distortion of the cameras 38 and 40 and associated hardware can be determined. Using the deviation from the expected locations, a transformation function can be determined for each projector, and applied to the input video stream to compensate for the distortion in the cameras.

After the distortion of the cameras is determined, the physical template 70 may be removed, and the distortion of the display itself can be determined. The display may have a number of types of distortion including spatial distortion, color distortion, luminance distortion, etc. To determine the spatial distortion of the projection display, for example, an input signal may be provided to selected projectors 32 and 34 to project a number of discrete images, each exhibiting a predetermined or known pattern. The known pattern may be captured from the standard input video stream. The cameras 38 and 40 can then be used to capture a number of capture images of at least a portion of the screen 36. Using the capture images, the distortion of the projection display can be determined by, for example, comparing the capture images with predetermined expected images. Alternatively, or in addition to, the distortion can be determined by comparing the location of selected features of the predetermined pattern in adjacent discrete images, and more preferably, in selected overlapping regions 60 between images. By using an affine, perspective, bilinear, polynomial, piecewise polynomial, global spline, or similar technique, a transformation function can be determined and applied to the input video stream to compensate for the spatial distortion of the projectors 32 and 34. It is contemplated that the distortion introduced by the cameras 38 and 40 may be removed from the capture images, as described above, before the distortion of the projection system is determined.

To determine the color and luminance distortion of the projection system, a number of input signals of varying intensity may be sequentially input to the projection display, wherein each input signal corresponds to a flat field image of a selected color. For example, a first input signal may correspond to a red flat field image having an LCD input intensity of "255" or the brightest input value. The next input signal may also correspond to a red flat field image, but may have a dimmer LCD input intensity of "220". Input signals having progressively lower intensity may be provided until the input signal has a LCD input intensity of "0" corresponding to black, the dimmest input value. These inputs may be expressed as bright to dark equivalents especially if the input is an analog voltage instead of a digitally measured value. This process may be repeated for both blue and green flat field images. The corresponding cameras preferably capture each of the flat field images. The resulting images are preferably stored as an array of capture images or compressed versions thereof in a Reference Images and Data Block 100 within the corresponding processor (see FIG. 4). Once collected, the non-desirable characteristics of each capture image can be determined including the color corresponding and input intensity variant luminance domes of each of the projectors 32 and 34.

Once the luminance domes are identified, a ceiling and floor may be determined for both color and intensity, across the entire display. For example, one projector may be brighter than another even though all are driven at a maximum intensity (e.g. LCD "255"), and the brightness provided by each projector may decrease near the edges of the image. Accordingly, a ceiling may be selected to match the dimmest superposition result of all the tiles when all projectors are operated at maximum intensity. Likewise, a floor may be selected to match the brightest superposition result when all projectors are operated at minimum intensity (LCD "0").

Thereafter, a transformation function may be determined for reducing the luminance domes across selected tiles, and for matching the brightness and color of each tile with adjacent tiles. For example, the transformation function may be represented by a color look up table of captured or compressed color domes, a nearest neighbor detection and identification function and an interpolation function among the nearest neighbors to determine the input level needed at the display to output the desired linear output level.

In one embodiment, the transformation function makes the luminance variation across the entire display less than about two percent, which is less than one just-noticeable-difference (JND) according to Weber's Law. To help achieve this level of luminance uniformity, the transformation function is preferably a function of the X and Y location on the display, and for some image source technologies such as polysilicon LCDs, the LCD input intensity value. Preferably, the variations across the display are held to be less than one JND in accordance with the contrast modulation sensitivity curve of human vision. This curve allows more or less variation as a function of spatial frequency.

Figure 13:
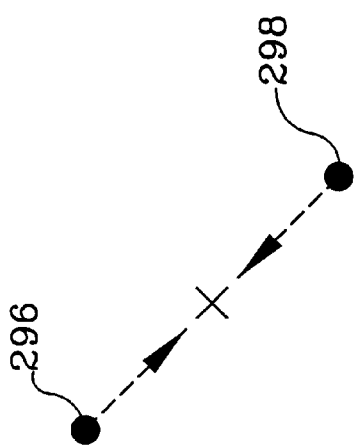
FIG. 13 is a diagram showing the operation of an illustrative transformation function that can be used to reduce the spatial distortion in a display by moving selected features toward a corrective location.
Figure 14:
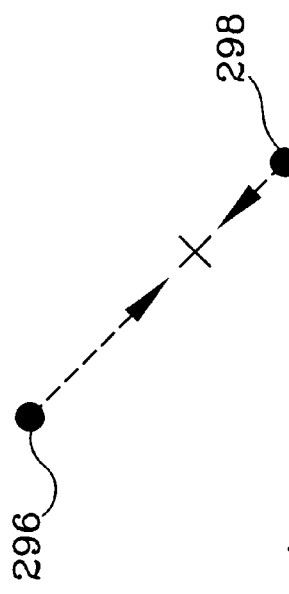
FIG. 14 is a diagram showing the operation of an illustrative transformation function that may be used to reduce the spatial distortion in a display by selected features toward a corrective location by a distance that is related to a relative method, a weighted average for example, modified by composite image or global constraints.

When the display has overlapping tiles, it is contemplated that the distortion of the system may be directly determined from patterns projected on the display. For a tiled display having overlapping discrete images, a first feature may be identified in a selected overlapping region, wherein the first feature is projected by a first projector. Then, a second feature may be identified in the same selected overlapping region, wherein the second feature is projected by a second projector, and wherein the second feature corresponding to the first feature. The spatial relationship between the first and second features may then be determined, and a first transformation function for the first projector can be identified therefrom. Likewise, a second transformation function for the second projector can be identified. A further discussion of this can be found below with reference to FIGS. 12–14.

Finally, it is contemplated that the cameras may be periodically activated to capture a new capture image. The determining block in the processor blocks 44 and 46 may determine if the newly captured image has one or more non-desirable characteristics, and the identifying block of the processor blocks 44 and 46 may identify a new transformation function that can be used to process the input video stream and provide processed input video signals to projectors 32 and 34 to reduce the identified non-desirable characteristics. Thus, it is contemplated that the present invention may be used to periodically re-calibrate the display with little or no manual intervention. The period of re-calibration may be increased or decreased as required by the operational environment. For example, it may be done at a 60 Hz rate to negate effects in a high vibration environment. In a benign environment, such as may happen in a home, the period may be reduced to 0.001 Hz or less.

It is also contemplated that processor 52 may include built-in-test logic. The built-in-self test logic may periodically detect if any portion of the display has failed, and if so, correcting for the failure by appropriately re-calibrating the display system. This is particularly useful when the discrete images overlap one another by about 50 percent or more. The 50% value, as an example, demarcates a packing arrangement that is fully redundant, leading to significant fail-operational system attributes. Fail operational means that a component can fail but the system continues to be fully operational. With a 50% overlap, if one projector fails, at least one more is ready to fill in the void resulting in significant gains in system reliability.

To save memory costs, the transformation functions, and the extracted features, information and data sets as described herein, are preferably represented and stored as a number of reduced information sets such as affine transformation or forward differencing coefficients or compression coefficients like those recommended in JPEG or MPEG specifications. Interpolation or the like can then be used to reconstruct the appropriate correction factors for any location among the selected points (see FIG. 11 below).

Figure 4:
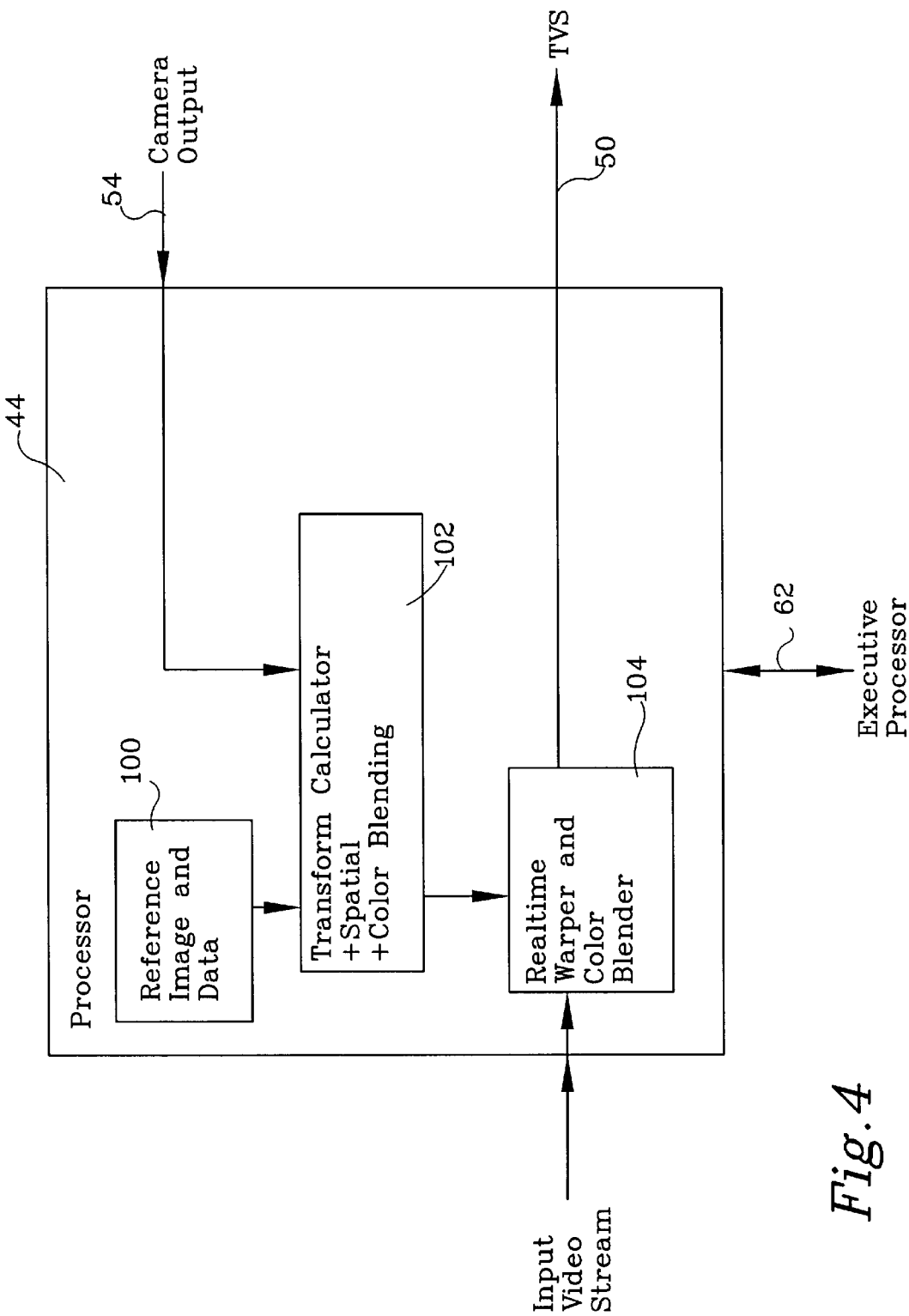
FIG. 4 is a block diagram showing an illustrative implementation for one of the processor blocks of FIG. 3.

FIG. 4 is a block diagram showing an illustrative implementation for one of the processor blocks of FIG. 3. In the illustrative embodiment, processor block 44 of FIG. 3 is shown. The processor block 44 includes a Reference and Measured Imagery Block 100, a Transform Calculator Block 102 and a Real Time Warper and Color Blender Block 104. Note that any of the non-real-time calculations and operations can be shared with or moved to the Executive Processor 48 (see FIG. 3).

The Processor 44 and the Executive Processor 48 have access to the captured and measured images shown by the Projector and the neighboring projectors via the Reference Images and Data Block 100. The captured images are analyzed by the corresponding processors, and features are extracted. In the case of spatial compensation functions, feature extraction may include seeking, detecting and identifying anchor points, as more fully described below. In the case of color compensation, a series of images may be projected onto the screen via the projector(s) under test. These images may be monochrome or color flat field images ranging from digital input values from 0 to 255 for red, green and blue separately. The vignetting aspects of the camera lens aperture and assembly may also be captured and tallied into the result. The vignette aspect of the camera may be measured ahead of time using a flat white field image provided by a uniformly illuminated white flat field and stored away as a priori information, preferably image-compressed in the Reference Images and Data Block 100.

The Reference Images and Data imagery are compared in the Transform Calculator Block 102. The various test images—including spatial and color test images—are analyzed in this block. Salient and relevant features are extracted automatically using variations of filter, threshold, linearity correction, and gamma correction methods. In order to obtain spatial compensation, the affine, perspective, bilinear, polynomial, piecewise polynomial, or global spline transformation, for examples, may be computed by comparing the measured spatial test pattern features with resident reference test image features. For color information, the gamma, gain and offsets of the camera, digitizer and projectors may be extracted. These and related features are categorized and solved to produce a set of spatial and color compensating transform coefficients. The Transform Calculator Block 102 thus includes both the determining and identifying blocks discussed above.

The compensating coefficients, typically calculated in a non-real-time mode via the Executive processor 48, are loaded into the Real-time Warper and Color Blender block 104. The Real-time Warper and Color Blender block 104 then converts the coefficients into high-speed real-time compensation signals. The Transformed Video Stream (TVS) 50 is a stretched/compressed version of the Input Video Stream. The stretching and compressing can be local or global with respect to the tile and its neighbors. Warping is applied in color and space in a manner that when the Transformed Video Stream (TVS) is passed through the projector-screen system, the output image emerges in spatial and color alignment and in any other known image attribute such as temporal alignment.

It is contemplated that the Real-time Warper and Color Blender Block 104 can be implemented using a combination of standard processing components including high speed look-up tables, high speed digital signal processors, image memory, x/y position counters, bilinear interpolation devices (often implemented as multiplier-adder blocks or look-up tables) and forward differencing engines (made from coefficient registers, adders and latches, for example). Other components may also be used.

Figure 5:
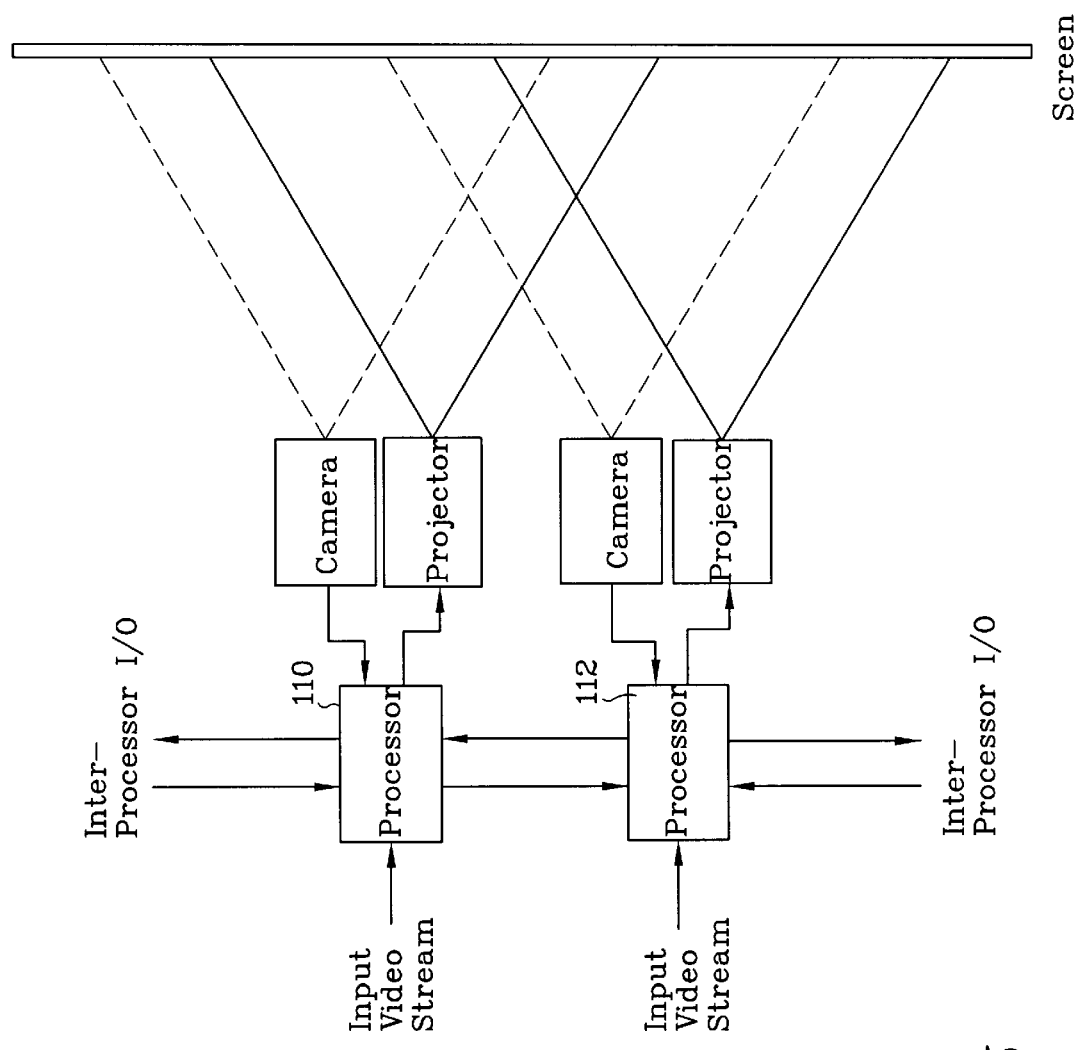
FIG. 5 is a schematic diagram of an embodiment similar to that shown in FIG. 3 with Inter-Processor I/O between processor blocks.

FIG. 5 is a schematic diagram of an embodiment similar to that shown in FIG. 3, with Inter-Processor I/O extending between processor blocks. The I/O function also includes mechanical coupling to enable interlocking and proper spacing of each display. The contemplated mechanical coupling includes spacing, light baffle, snap-lock mechanisms, stacking support, and thermal management conduits. The Inter-Processor I/O may be implemented as video channels, parallel and/or serial data bus transmission lines, or any other type of communication link. With the Inter-Processor I/O function provided, local processors 110 and 112 form a distributed array of processors, potentially eliminating the need for central executive processor 48 of FIG. 3. In one embodiment, processor 110 may assume the function of a global executive ensuring image quality over the whole array, processor 112 may assume the function of a color blend calculator, while another (not shown) may assume the function of a spatial warp calculator, and yet another may assume the function of a built-in test monitor, etc. Preferably, each processor applies the appropriate transformation in color, space and time to the corresponding portion of the input video stream under its immediate span of control to achieve a real-time transformation process for its tile.

While an executive processor 48 is not precluded, the Inter-Processor I/O permits each tile cluster of resources to engage in dialog with its neighbors. This may be implemented as a local and global arrangement of information including image measurement and system compensation. The function of the processor array may identify the location of each tile, identify the neighboring tiles, and analyze the results including selected neighboring results. Accordingly, an arbitrary number and configuration of tiles may be provided enabling the tiling modules to be added or subtracted transparently by the user.

Figure 6:
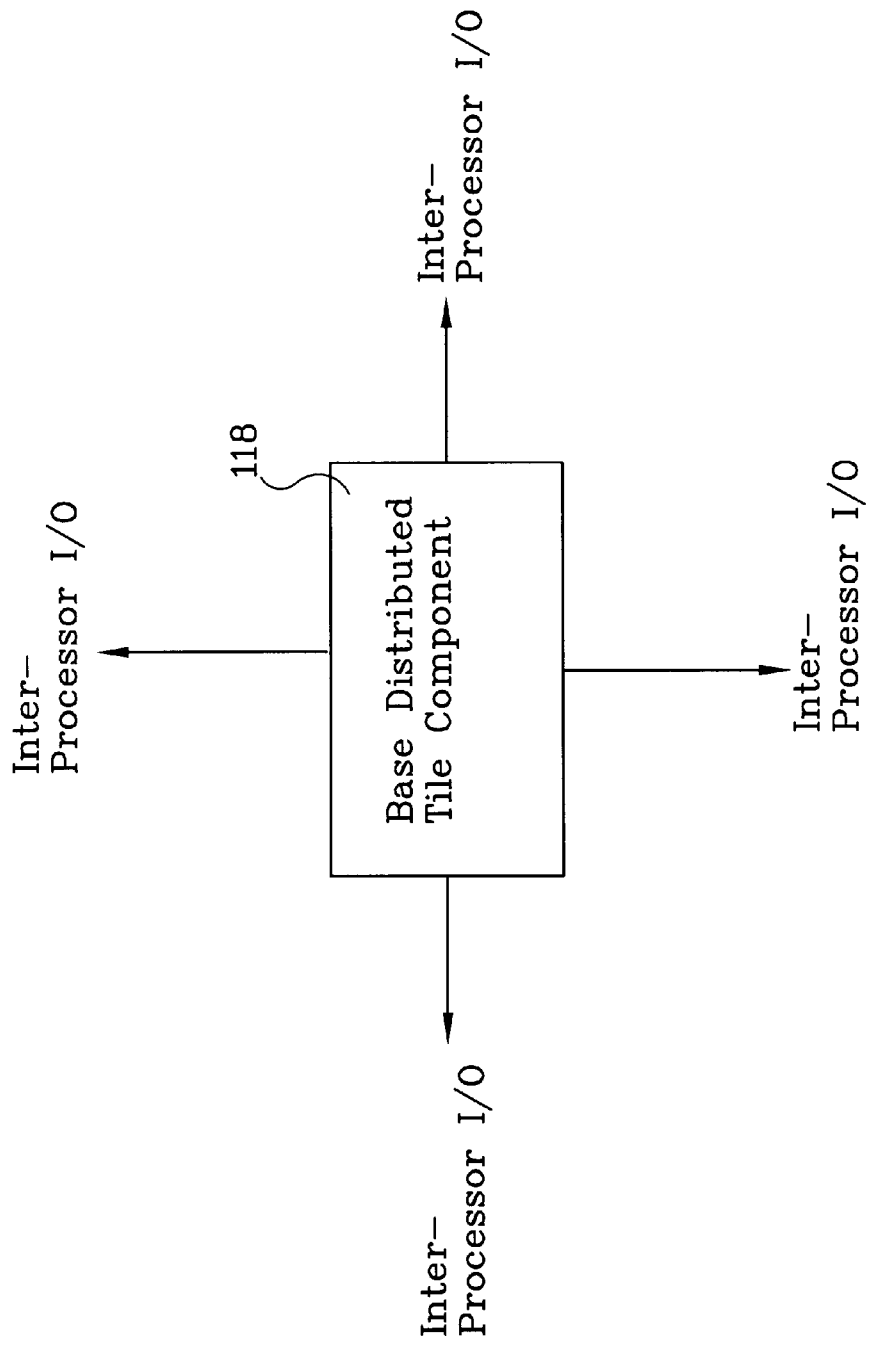
FIG. 6 is a block diagram showing a Base Distributed Tile Component in accordance with an illustrative embodiment of the present invention.
Figure 7:
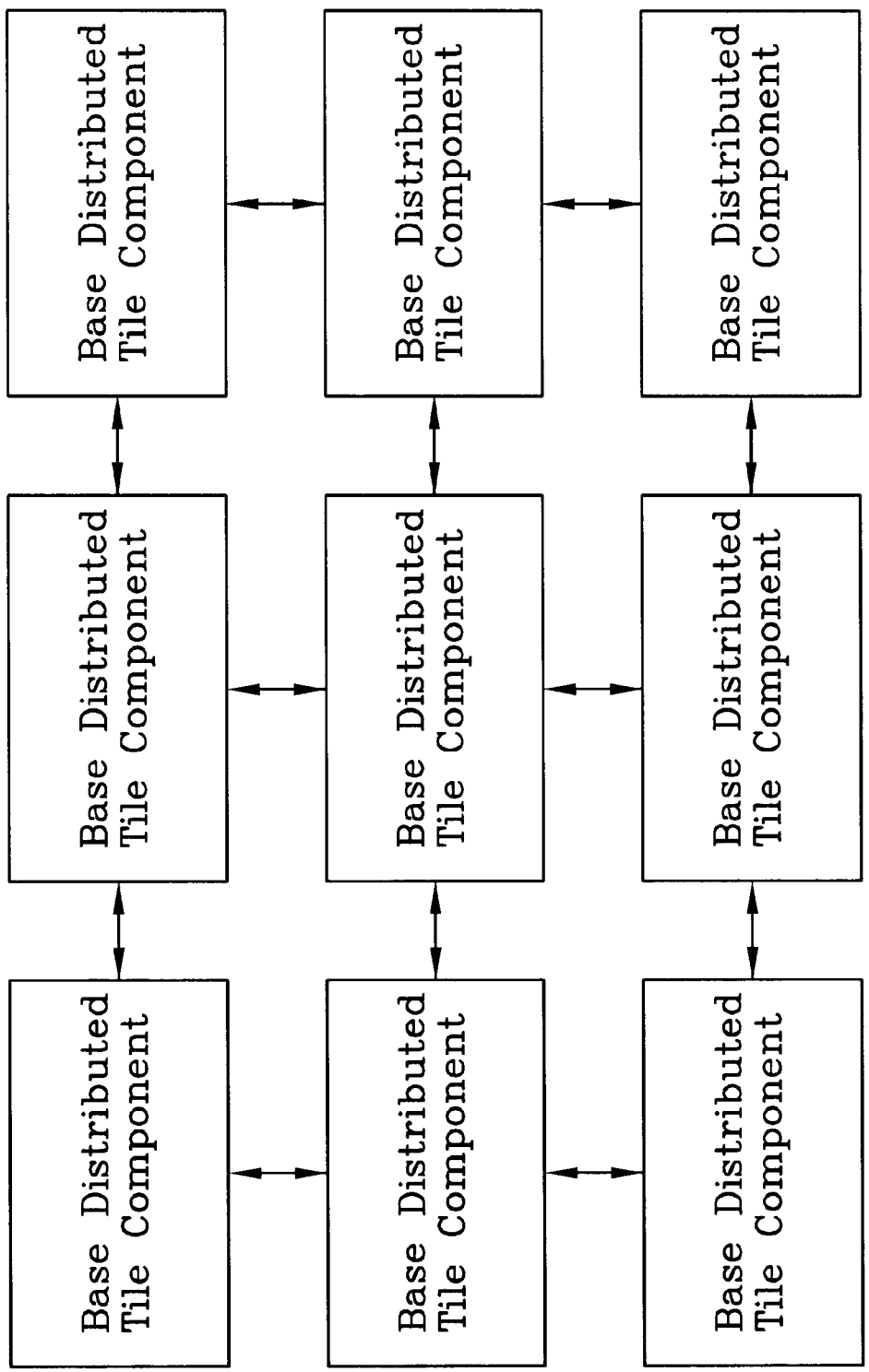
FIG. 7 is block diagram showing a 3×3 array of the Base Distributed Tile Components of FIG. 6.

FIG. 6 is a block diagram showing a Base Distributed Tile Component in accordance with an illustrative embodiment of the present invention. The Base Distributed Tile Component 118 preferably includes a camera, a projector, electro-mechanical I/O and a processor, as shown for example in FIG. 5. The Inter-Processor I/O is shown in a north, east, west and south arrangement. It is contemplated that the Inter-Processor I/O may be implemented to include more or less channels of high to low speed interfaces, and may be connected in a one-, two- or three-dimensional array. A 3×3 array of Base Distributed Tile Components is shown in FIG. 7.

Figure 8:
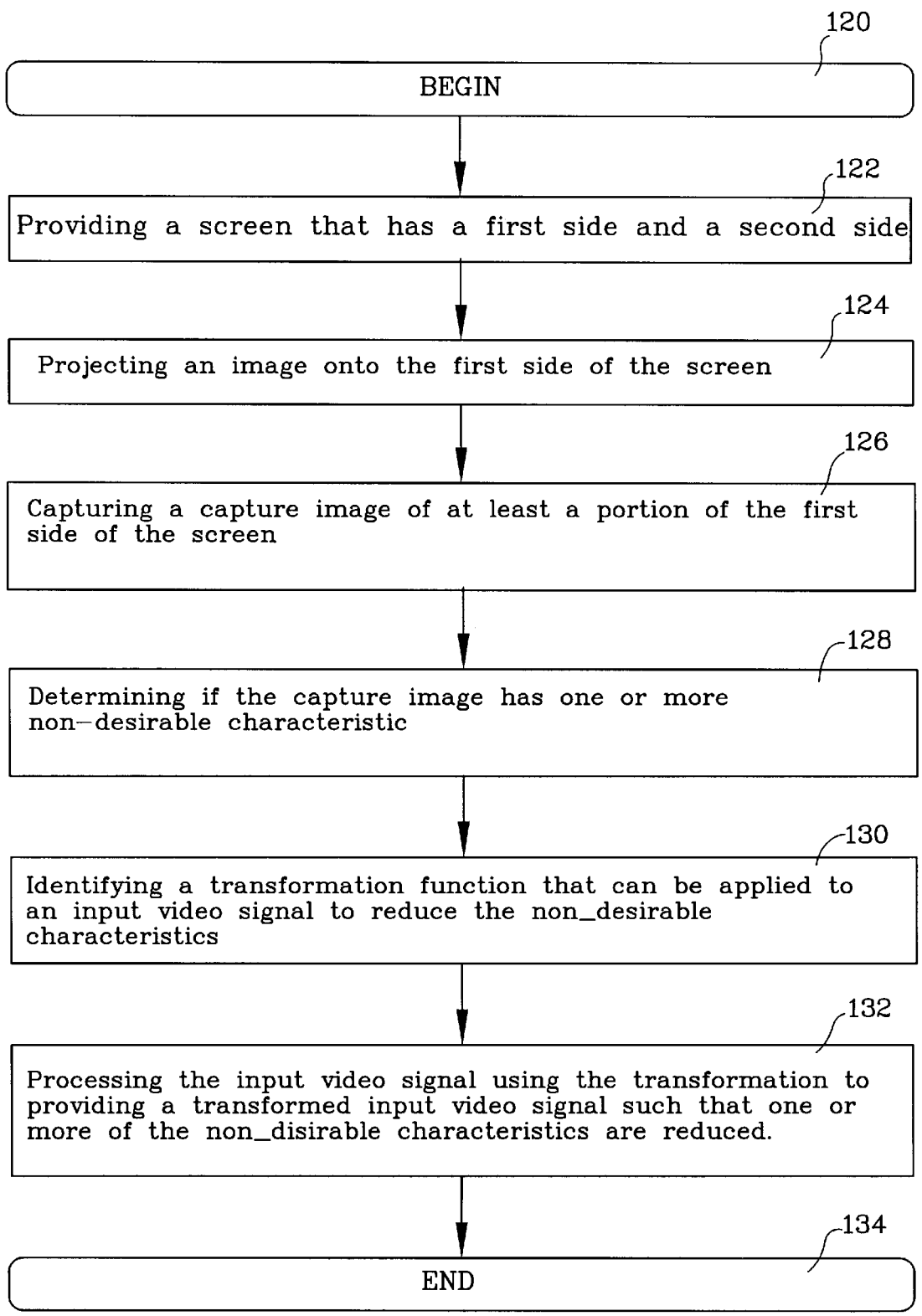
FIG. 8 is a flow diagram showing an illustrative method in accordance with the present invention.

In accordance with the above, FIG. 8 shows a flow diagram of an illustrative method in accordance with the present invention. The algorithm is entered at element 120, and control is passed to element 122. Element 122 provides a screen that has a first side and a second side. Control is then passed to element 124. Element 124 displays or projects an image onto the first side of the screen. Control is then passed to element 126. Element 126 captures an image of at least a portion of the first side of the screen. Control is then passed to element 128. Element 128 determines if the capture image has one or more non-desirable characteristics. Control is then passed to element 130. Element 130 identifies a transformation function that can be applied to an input video signal to reduce the non-desirable characteristics. Control is then passed to element 132. Element 132 processes the input video signal using the transformation function to provide a transformed input video signal such that one or more of the non-desirable characteristics are reduced. Control is then passed to element 134, wherein the algorithm is existed.

Figure 9:
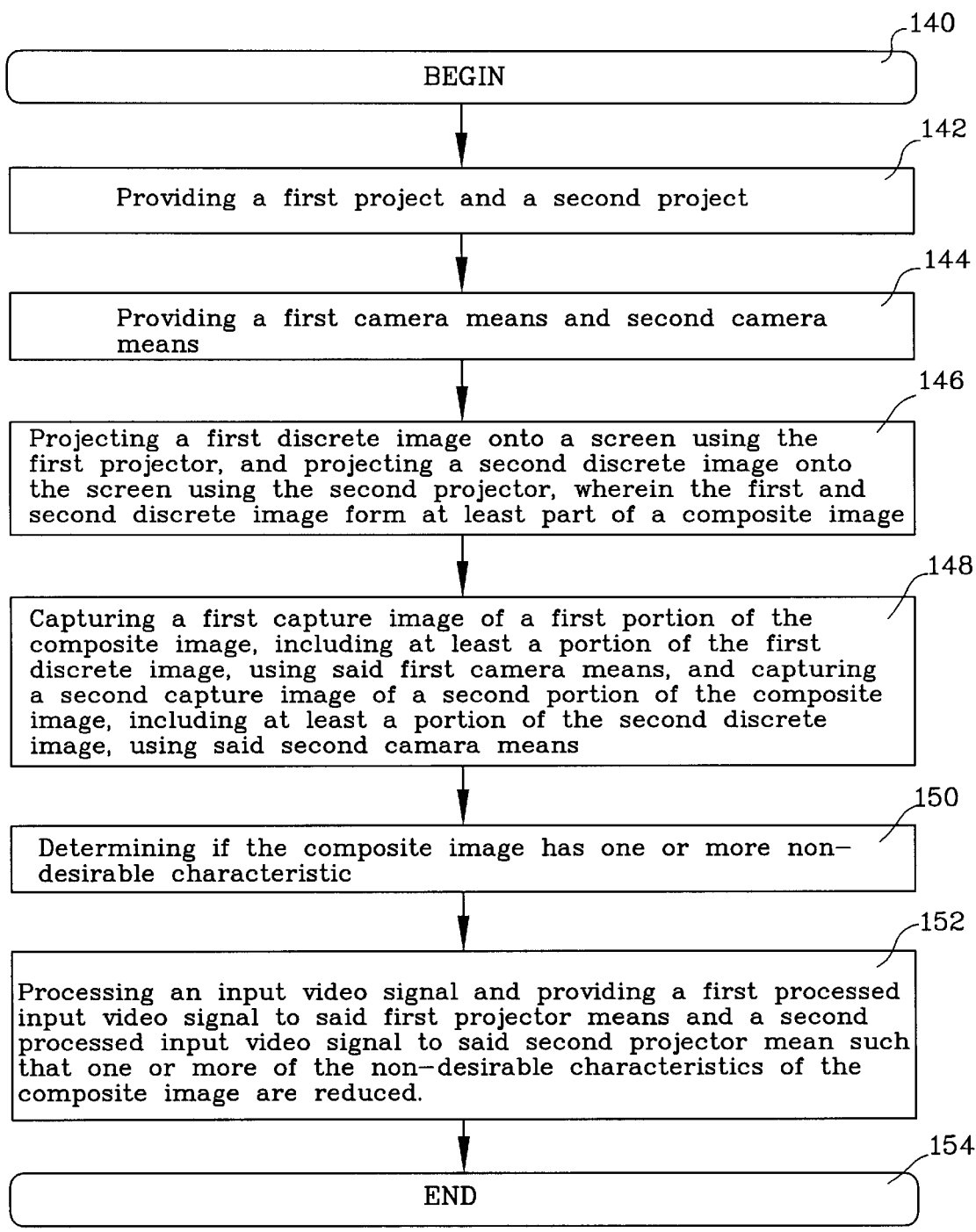
FIG. 9 is a flow diagram showing another illustrative method in accordance with the present invention.

FIG. 9 is a flow diagram showing another illustrative method in accordance with the present invention. The algorithm is entered at element 140, wherein control is passed to element 142. Element 142 provides a first display (a projector, for example) and a second display (which may also be a projector, for example). It is contemplated that the displays may be a heterogeneous mix of display devices, including direct view as well as projected, real and virtual imaging devices. Control is then passed to element 144. Element 144 provides a first camera and a second camera. Control is then passed to element 146. Element 146 projects a first discrete image onto a screen using the first projector, and projects a second discrete image onto the screen using the second projector, wherein the first and second discrete images form at least part of a composite image. Control is then passed to element 148. Element 148 captures a first capture image of a first portion of the composite image, including at least a portion of the first discrete image, using the first camera. Element 148 also captures a second capture image of a second portion of the composite image, including at least a portion of the second discrete image, using the second camera. Control is then passed to element 150.

Element 150 determines if the composite image has one or more non-desirable characteristics. Determining one or more non-desirable characteristics is contemplated to include auto and cross correlation of extracted features among the redundant capture images each camera takes of its primary tile and neighboring tiles. Control is then passed to element 152. Element 152 processes an input video signal and provides a first processed input video signal to the first projector and a second processed input video signal to the second projector such that one or more of the non-desirable characteristics of the composite image are reduced. Control is then passed to element 154, wherein the algorithm is exited.

Figure 10:
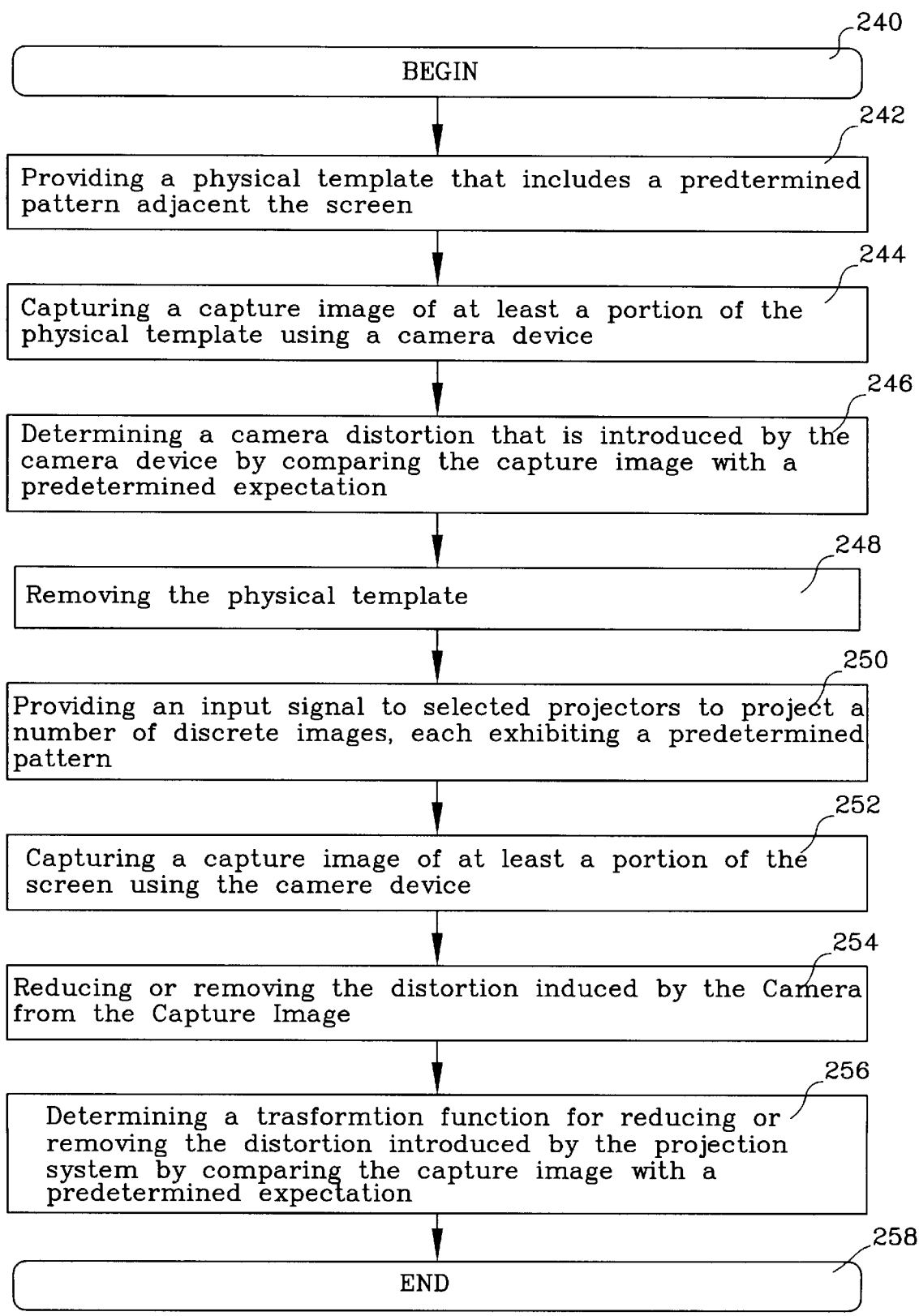
FIG. 10 is a flow diagram showing yet another illustrative method of the present invention, including distinguishing the distortion introduced by the camera from the distortion introduced by the rest of the display.

FIG. 10 is a flow diagram showing yet another illustrative method in accordance with the present invention, including distinguishing the distortion introduced by each camera from the distortion introduced by the rest of the display. The algorithm is entered at element 240, wherein control is passed to element 242. Element 242 provides a physical template adjacent to the screen. The physical template preferably includes a predetermined pattern. Control is then passed to element 244. Element 244 captures a capture image of at least a portion of the physical template using a camera device. Control is then passed to element 246. Element 246 determines a camera distortion that is introduced by the camera device by comparing the capture image with a predetermined expectation. Control is then passed to element 248. Element 248 removes the physical template. Control is then passed to element 250.

Element 250 provides an input signal to selected projectors to project a number of discrete images, each exhibiting a predetermined pattern. It is understood that only selected projectors may project a pattern, rather than all projectors. Control is then passed to element 252. Element 252 captures a capture image of at least a portion of the screen using the camera device. Control is then passed to element 254. Element 254 reduces or removes the distortion introduced by the camera from the capture image. Control is then passed to element 256. Element 256 determines a transformation function for reducing or removing the distortion introduced by the projection system by comparing the capture image with a predetermined expectation. Control is then passed to element 258, wherein the algorithm is exited.

Figure 11:
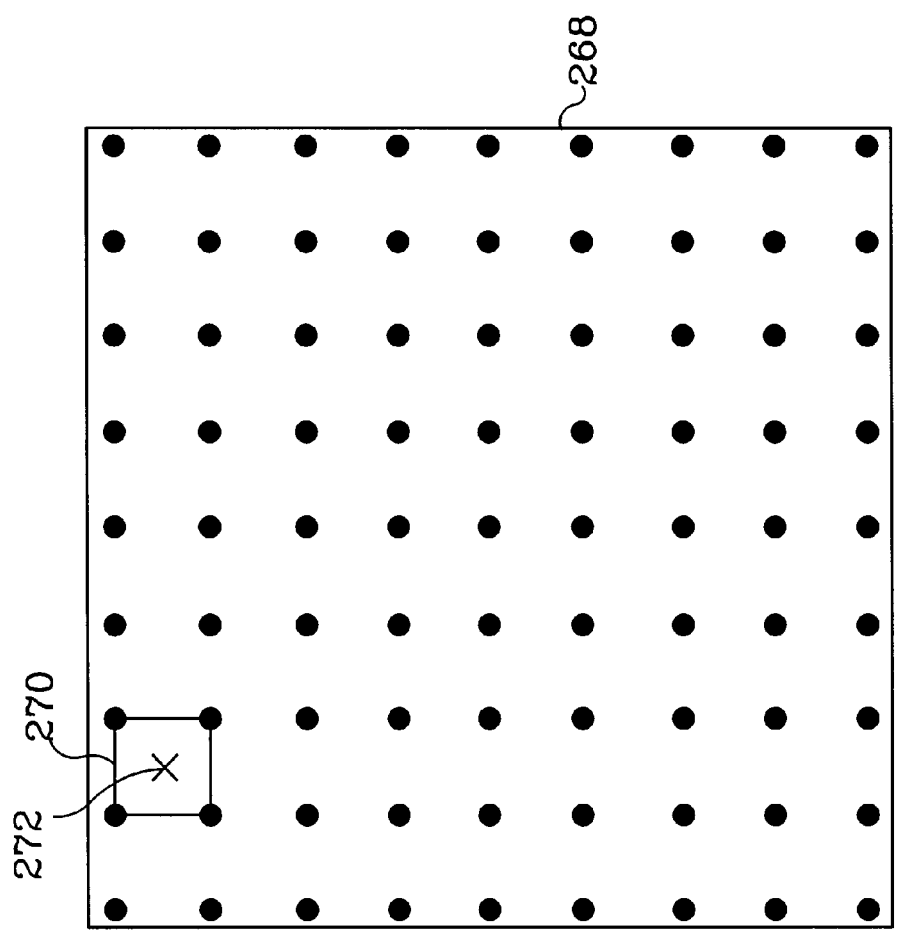
FIG. 11 is a diagram showing an illustrative pattern that is displayed and later captured for determining spatial distortions in the display.

FIG. 11 is a diagram showing an illustrative pattern with 9×9 dots that may be displayed and later captured for determining spatial distortions in a display. In the illustrative embodiment, each tile 268 is divided into eight segments across and eight segments down resulting in 64 quadrilateral regions. The vertices of each region are the corresponding tie points. Accordingly, the tie points in the array of regions are used to determine the local distortion in region 270 and others across the tile 268. Different sets of local transformation coefficients correspond to different quadrilateral regions. The geometric distortion within each region is modeled by a transformation function governed by a pair of bilinear equation with eight degrees of freedom. The eight transformation coefficients are determined by comparing the known locations of the four tie points in the capture image to the corresponding expected locations as determined, for example, using a capture image of the template overlay.

The appropriate correction factor for those locations that fall between the dots (for example, location 272) can be determined by using bilinear interpolation or the like. A further discussion of bilinear transformations can be found in *Digital Image Warping*, by George Wolberg, IEEE Computer Society Press Monograph, pages 50–51, which is incorporated herein by reference. A further discussion of spatial transforms can found in *Digital Image Processing*, 2nd edition, Refael C. Gonzalez and Paul Wintz, pages 246–251, which is also incorporated herein by reference.

It is contemplated that the dot pattern need not be a regular lattice of points but may be derived by extracting stochastically reliable anchor points from snapshots of the incoming video stream captured in frame or image memory. These may be further correlated using auto and cross correlation algorithms, Bissels algorithm for example, which assimilates common points from a cloud of points viewed from different locations.

Figure 12:
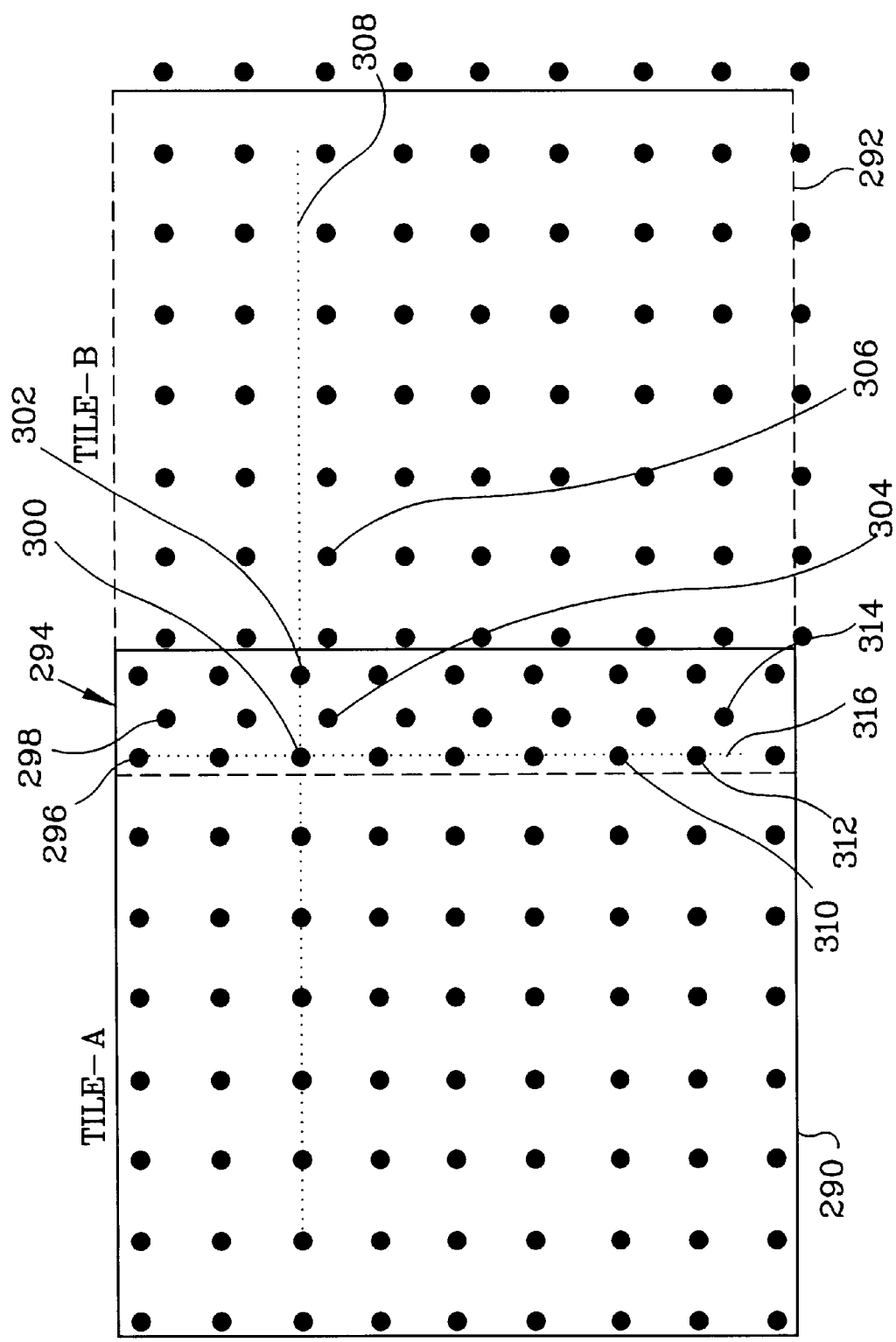
FIG. 12 is a diagram showing the illustrative pattern of FIG. 11 displayed on two adjacent and overlapping tiles, also for determining spatial distortions in the display.

FIG. 12 is a diagram showing the illustrative pattern of FIG. 11 displayed on two adjacent and overlapping tiles. A first tile is shown at 290 and a second tile is shown at 292. The first tile 290 and the second tile 292 are overlapping by a predetermined amount, as shown at 294. Each tile has a projector (not shown) for projecting a discrete image onto the corresponding tile. In the embodiment shown, each of the projectors is projecting a 9×9 array of dots. If the projectors were properly aligned, and there was no distortion in the system, each of the dots in the overlap region 294 would overlap one another. However, and as shown in FIG. 12, if the projectors are not aligned the dots do not overlap one another.

To correct for this misalignment/distortion as detected by the camera and feedback system described herein, the present invention contemplates pre-warping the input video signal so that the corresponding dots properly align with one another. For example, the first projector, which corresponds to the first tile 290, projects dot 296, and a second projector, which corresponds to the second tile 292, projects a corresponding dot 298. A first transformation function may be provided for effectively moving the location of the first dot 296 toward the second dot 298 when applied to the input signal of the first projector. Alternatively, or in addition to, a second transformation may be provided for effectively moving the location of the second dot 298 toward the first dot 296 when applied to the input signal of the second projector. If done properly, the first dot 296 and the second dot 298 overlap one another on the screen. Further, if done in accordance with the absolute or relative methods referred to above, then the compensated image is constrained globally and appropriately over the entire image.

Using a relative compensation method, it is contemplated that the first transformation function may move the location of the first dot 296 toward the second dot 298 by an amount substantially equal to one-half the distance between the first and second dots. Likewise, the second transformation function may move the location of the second dot 298 toward the first dot 296 by an amount substantially equal to one-half the distance between the first and second dots. This is a straight averaging approach, devoid of global fit constraints like having to ensure that the implied grid lines are straight through the first derivative and equally spaced and is shown explicitly in FIG. 13.

Alternatively, or in addition to, the first transformation function may move the location of the first dot 296 toward the second dot 298 by an amount that is weighted by a predetermined blending function or some other factor at the first dot 296 relative to the second dot 298, and the second transformation function may move the location of the second dot 298 toward the first dot 296 by an amount that is weighted by a predetermined blending function or some other factor at the second dot relative to the first dot 296. This is a weighted average approach, and is shown explicitly shown in FIG. 14. Preferably, the weighting function relates to the blending function used for blending the color information of the tiles. This may be a ramp or spline or some other suitable function known in the art.

When more than two corresponding dots must be considered, such as when three or more images overlap in a selected region, each of the corresponding dots may be moved toward a corrected location. This may be accomplished by using a similar averaging or weighted averaging approach, as discussed above.

Other approaches are also contemplated. For example, it is contemplated that the transformation functions may maintain a predetermined relationship between selected dots. For example, dots 300, 302, 304 and 306 are from a common row of dots, and thus should fall along a common line 308. The transformation functions may maintain a linear relationship between these dots while still compensating for the distortion in the system. Likewise, dots 310, 312 and 314 are from a common column of dots, and thus should fall along a common line 316. The transformation functions may maintain a linear relationship between these dots while still compensating for the distortion in the system. Preferably, the linear relationship will provide continuity through the first derivative of the line functions and will preserve relatively uniform spacing among the implied connecting lines.

Figure 15:
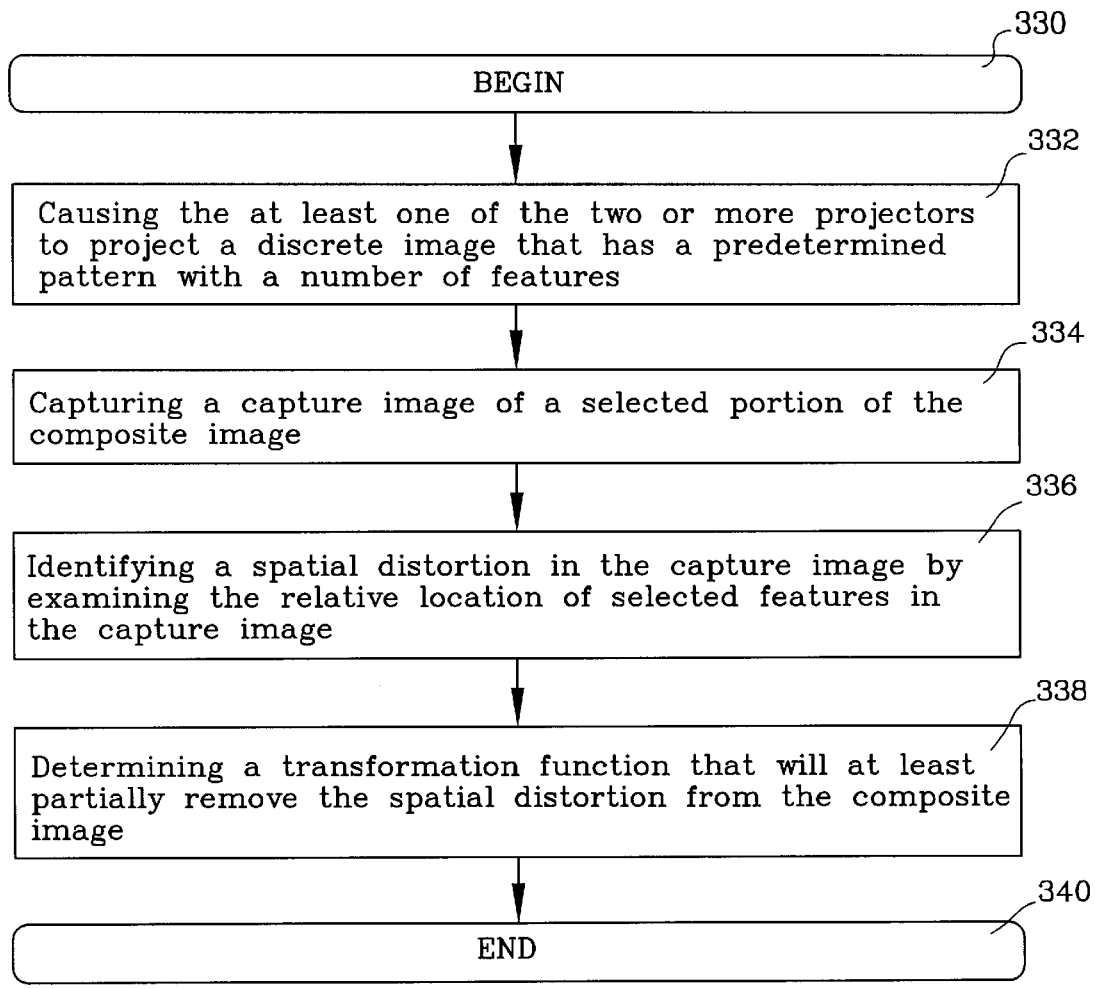
FIG. 15 is a flow diagram showing an illustrative method for at least partially removing a spatial distortion from the display.

In accordance with the above, FIG. 15 is a flow diagram showing an illustrative method for at least partially removing a spatial distortion from the display. The algorithm is entered at element 330, wherein control is passed to element 332. Element 332 causes at least one of the projectors to project a discrete image that has a predetermined pattern with a number of features. Control is then passed to element 334. Element 334 captures a capture image of a selected portion of the composite image. Control is then passed to element 336. Element 336 identifies a spatial distortion in the capture image by examining the relative location of selected features in the capture image. Control is then passed to element 338. Element 338 determines a transformation function that will at least partially remove the spatial distortion from the composite image. Control is then passed to element 340, wherein the algorithm is existed. Preferably, this method identifies the spatial distortion of the display by comparing projected image of a tile relative to the projected image of a neighbor tile, rather than or in addition to being relative to a physical template.

Figure 16:
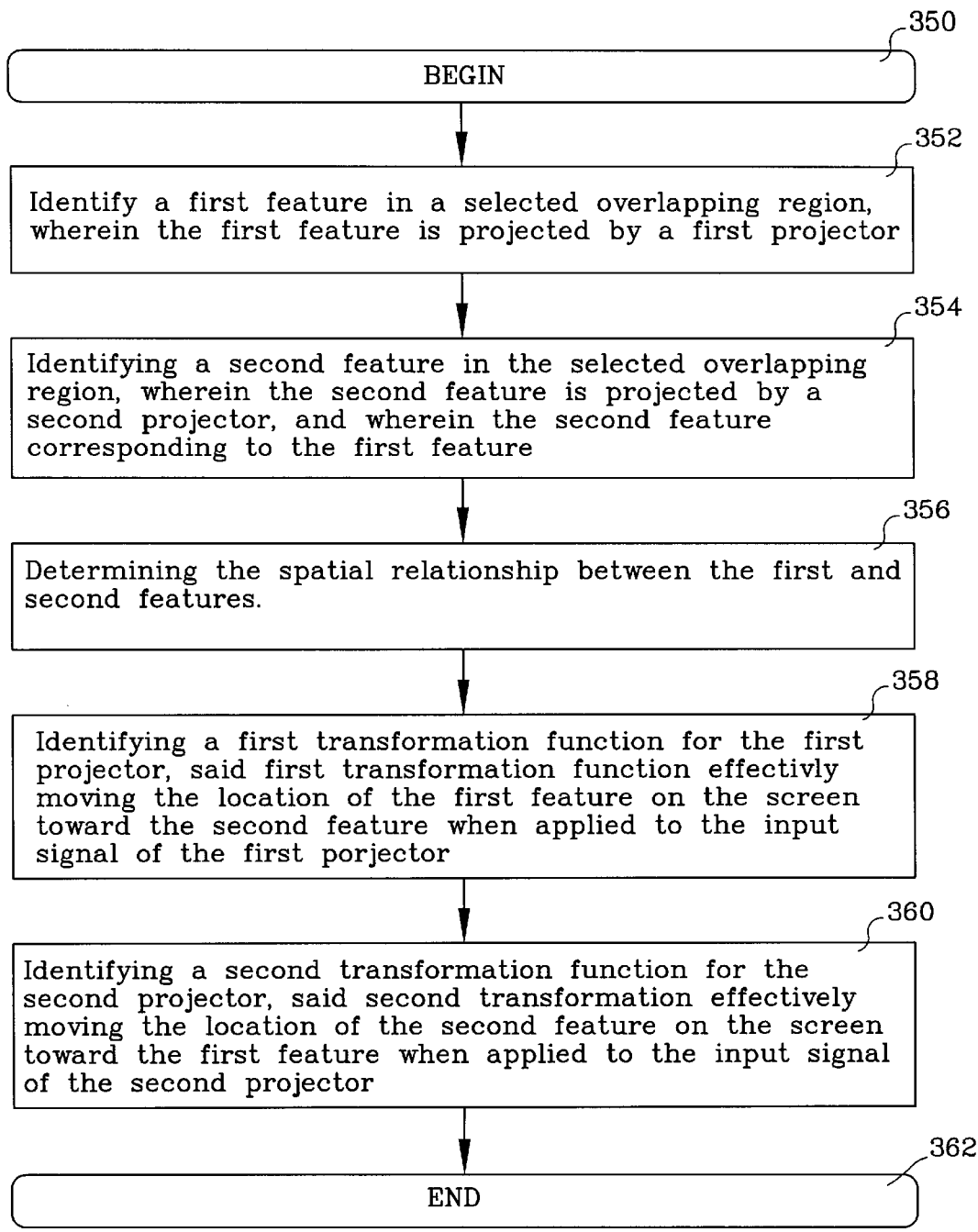
FIG. 16 is a flow diagram showing an illustrative method for identifying a transformation for a tiled display to at least partially removing a spatial distortion from the tiled display.

FIG. 16 is a flow diagram showing a method for identifying a transformation for a tiled display to at least partially removing a spatial distortion from the tiled display. The algorithm is entered at element 350, wherein control is passed to element 352. Element 352 identifies a first feature in a selected overlapping region, wherein the first feature is projected by a first projector. This first feature may be extracted from a snapshot of the incoming video image. Control is then passed to element 354. Element 354 identifies a second feature in the selected overlapping region, wherein the second feature is projected by a second projector, and wherein the second feature corresponds to the first feature. Again, the second feature may be extracted from the incoming standard video input. Control is then passed to element 356. Element 356 determines the spatial relationship between the first and second features, illustrative of establishing the relationship among an ensemble of features. Control is then passed to element 358. Element 358 identifies a first transformation function for the first projector. The first transformation function effectively moves the location of the first feature toward a corrective location when it is applied to the input signal of the first projector. Control is then passed to element 360. Element 360 identifies a second transformation function for the second projector. The second transformation function, applied simultaneously with the first described, effectively moves the location of the second feature toward the corrective location when it is applied to the input signal of the second projector. Control is then passed to element 362, wherein the algorithm is existed. The calculation of the correction function may be done periodically while the output is passed to the transformation function for real-time correction.

In accordance with the present invention, the location of the dots may be determined by: subtracting a black capture image from the capture image that includes the dots; examining the resulting image content above a noise threshold using spatial filters which have an all-pass kernel; measuring the center of gravity of the dots to find the corresponding dot locations; eliminating dots whose energy threshold is below the threshold; sorting the dot locations for correlation with known or expected dot patterns and deriving corrective transformation functions therefrom.

Figure 17:
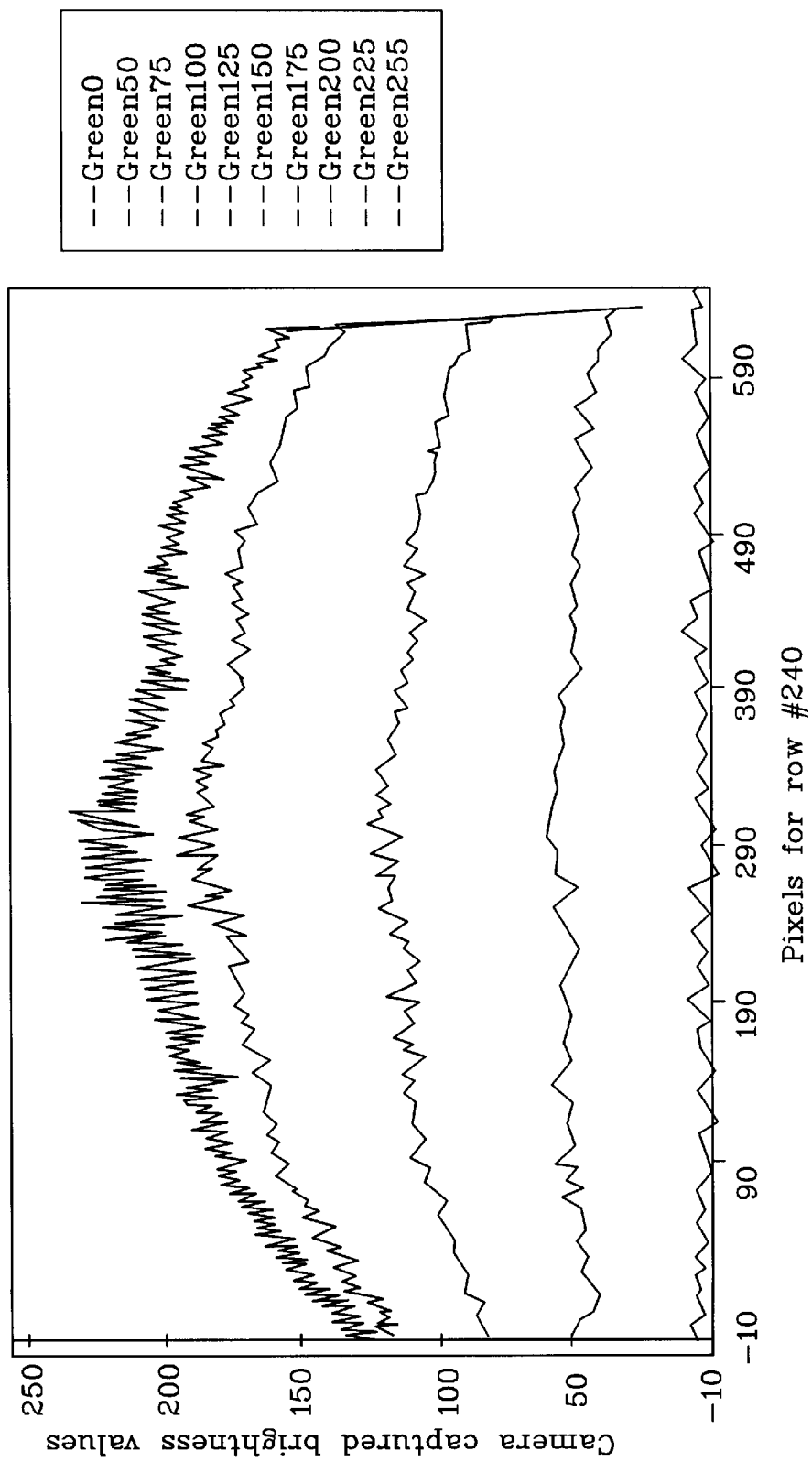
FIG. 17 is a graph showing the luminance domes for an LCD projector at various input intensities and showing how the dome shapes change depending on the input intensity level.

FIG. 17 is a graph showing the luminance domes for one LCD projector with various input intensities. As is evident, the magnitude of the luminance domes tends to increase as the input intensity increases. Also, the random brightness variation (e.g. noise) across the display tends to increases as the input intensity increases. This variation is attenuated and thus the signal to noise ratio augmented by filtering multiple time samples of dome capture images. This same general pattern is found for red, green and blue. In addition, each color typically has a different brightness value for the same input intensity. Further, in the case of polysilicon LCDs for example, the shape of the pattern changes as a function of the input intensity level, requiring the compensation function to attend to geometric and input intensity variables.

To determine the color and luminance distortion of a projection system, and in particular, a tiled display system, direct view or projection, a number of input signals of varying input intensity may be sequentially input to the projection display. This may be done at initial calibration or periodically. Each input signal may correspond to a flat field image of a selected color. For example, a first input signal may correspond to a red flat field image having an LCD intensity of "255". The next input signal may also correspond to a red flat field image, but may have a LCD intensity of "220". Input signals having progressively lower intensity may be provided until the input signal has a LCD intensity of "0". This process may be repeated for both blue and green or other color flat field images. A camera device may captures each of the flat field images, either as a single image if the field-of-view of the camera device corresponds to the entire display, or as multiple images if the camera device has a smaller field-of-view. The resolution of the camera device may be chosen to be appropriate with the selected field-of-view. For example, when the field-of-view of the camera device is relatively wide, capturing an image of the entire display, a higher resolution camera device may be used. Likewise, when the field-of-view of the camera device is relatively narrow, capturing an image of only a small portion of the display, a lower resolution camera device may be used. In any case, the resulting images are preferably stored as an array of capture images or reduced resolution capture images or as compression coefficient capture images. Once collected, the non-desirable characteristics of each capture image can be determined including the luminance or color domes for each projector.

Once the luminance or color domes are identified, a ceiling and floor function which may be a linear or a spline or other suitable function are preferably determined for both color (including hue) and intensity, across the entire display. For example, one projector may be brighter than another at maximum intensity (e.g. LCD "255"), and the brightness provided by each projector may decrease near the edges of the image. Accordingly, a ceiling may be selected to match the dimmest superposition area of the tiles when all projectors are operated at maximum intensity. Likewise, a floor may be selected to match the brightest superposition result of the tiles when all projectors are operated at minimum intensity (LCD "0").

Thereafter, a transformation function may be determined for compensating the luminance domes across selected tiles, and matching the brightness and color of each tile with adjacent tiles, thereby resulting in a linear display system. For example, the transformation function may be represented by a color look up table of captured or compressed color domes, a nearest neighbor detection and identification function and an interpolation function among the nearest neighbors to determine the input level needed at the display to output the desired linear output level. Preferably, the transformation function makes the luminance variation across the entire display less than about two percent for flat field test images, for example, which is less than one just-noticeable-difference (JND) according to Weber's Law. To help achieve this level of luminance uniformity, the transformation function is preferably a function of the X and Y location on the tile and of the input intensity level.

Figure 18:
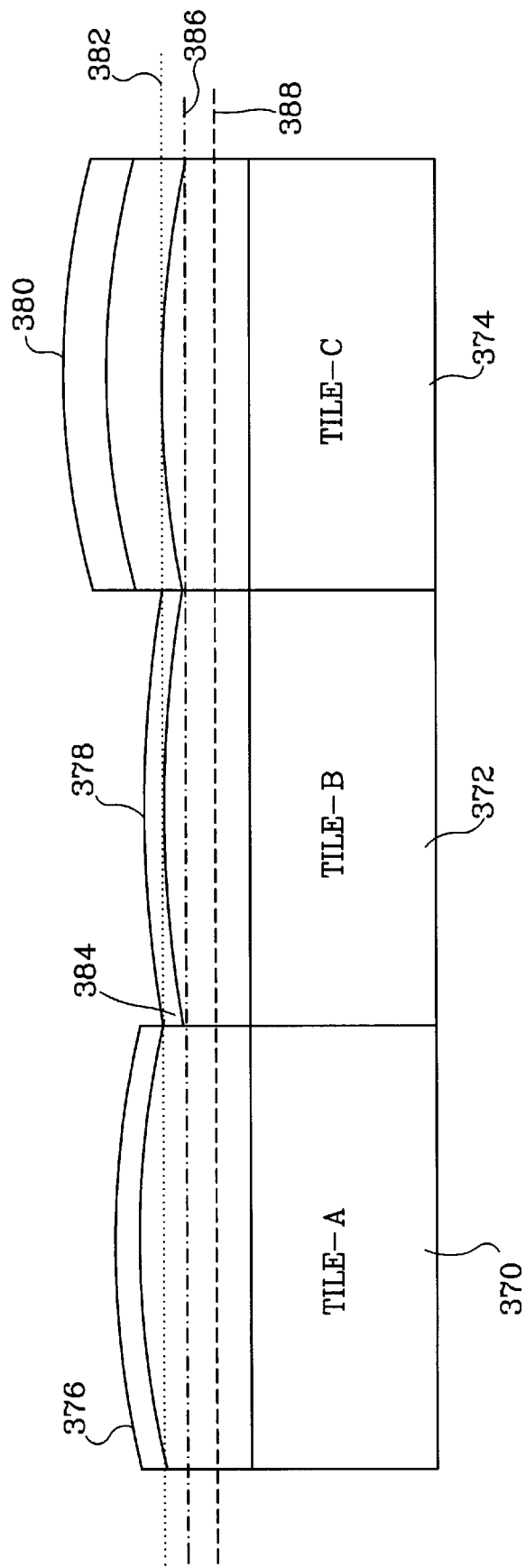
FIG. 18 is a schematic diagram showing the luminance domes for three tiled LCD projectors each at various input intensities.

FIG. 18 is a schematic diagram showing the luminance domes for three-tiled LCD projectors each at various input intensities. A first tile 370, second tile 372 and third tile 374 each have different maximum brightness values for a common LCD input intensity, such as an input intensity of "255" as shown at 376, 378 and 380, respectively. The transformation function for each of the tiles preferably compensates the luminance domes across selected tiles using the reduced luminance dome information to linearize the dome (x, y and input intensity dependent) behavior of each tile in the system and using the blending function to allow for display tile superposition. The transformation function also matches the hue of each tile with adjacent tiles, using the feedback image information in combination with known tri-stimulus color transformations or equivalent functions. For example, the transformation function for the first tile 370 may change the brightness in accordance with feedback behavior acquired at some time from the capture image of the first projector to lie along line 382 when the input intensity to the first projector has a value of "255" and when superposed over the output of tile 372. In the diagram shown, this may require that the center portion of the image be reduced more than the edge portions of the image because of the dome shape of the luminance profile. Likewise, the transformation function for the second tile 372 may change the brightness in accordance with feedback behavior acquired at some time from the capture image of the second projector to also lie along line 382 when the input intensity to the second projector has a value of "255" and when superposed with neighbor tile outputs. Finally, the transformation function for the third tile 374 may change the brightness of the third projector to lie along line 382 when the input intensity to the third projector has a value of "255" and in accordance with superposition with neighbor tile 372.

As alluded to above, the transformation functions are also preferably dependent on the input intensity that is provided to the projectors. This is the result of the dependence of the capture image domes on the input intensity to image sources like the polysilicon LCD.

For lower input intensities, the transformation functions may change the brightness of the first, second and third projectors to lie along, for example, lines 386 or 388 as a function of the blending functions, the luminance dome dependence on the X, Y location on the screen and input intensity to the tiled display system. In this way, the transformation functions may make the luminance, hue, and saturation variation across the entire display relatively small regardless of the input intensity provided. That accomplished or enabled, the image content may be arbitrary making the tiled display with camera feedback suitable for displaying general imagery.

Figure 19:
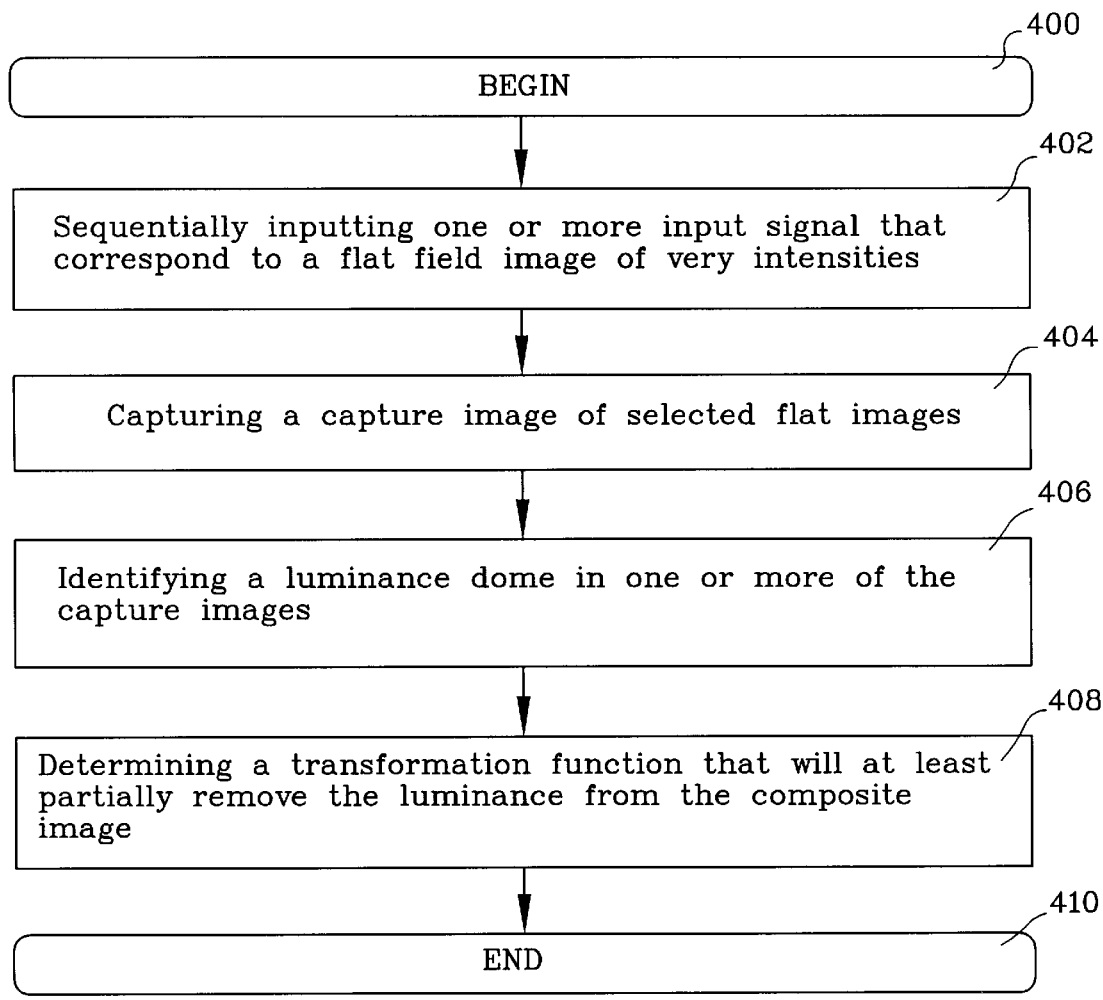
FIG. 19 is a flow diagram showing an illustrative method for at least partially removing a luminance distortion from the display.

In accordance with the above, FIG. 19 is a flow diagram showing a method for at least partially removing a luminance distortion from the display. The algorithm is entered at element 400, wherein control is passed to element 402. Element 402 sequentially inputs one or more input signals that correspond to a flat field image of varying intensity to each projector. Control is then passed to element 404. Element 404 captures a capture image of selected flat field images. Control is then passed to element 406. Element 406 identifies a luminance dome on one or more of the capture images. Control is then passed to element 408. Element 408 determines a feedback transformation function (dependent on X, Y and/or input intensity) that will at least partially remove the luminance domes from the composite image. Control is then passed to element 410, wherein the algorithm is existed.

Finally, a method for determining the boundaries of each tile of a tiled display when using a camera that has a field-of-view that encompasses more than one tile is contemplated. This method includes displaying a white field image, for example, on all but a selected tile. The camera may then capture an image of display including the selected tile. Then it is a relatively simple matter to determine the boundaries of the selected tile by identifying the location where the white field image begins/stops. Another method is to display a checkerboard pattern wherein each of the tiles assumes one of two flat field images. In this embodiment, the boundaries for each tile may be determined by identifying the location where each of the flat field images begins/stops. Another method is to display a pattern of dots whose outer boundaries when detected by the camera in combination with a detection function define the boundaries of each tile as well. These may be used by the feedback processor-camera system to identify, among other things, the alignment of the projectors relative to one another. Further, and when the discrete images overlap one another, these methods further identify the extent of the overlap.

Having thus described the preferred embodiments of the present invention, those of skill in the art will readily appreciate that the teachings found herein may be applied to yet other embodiments within the scope of the claims hereto attached.

What is claimed is:

1. A rear projection display system comprising:
   a screen having a projection side and a viewing side;
   an imaging means for producing an image on the projection side of the screen;
   a camera means positioned on the projection side of the screen for capturing a capture image of at least a portion of the projection side of the screen;
   determining means coupled to said camera means for receiving said capture image, and for determining if the capture image has one or more non-desirable characteristic; said determining means further identifying a transformation function that can be applied to an input video signal to reduce the non-desirable characteristics; and processing means coupled to said imaging means and to said determining means for processing the input video signal using the transformation function to provide a transformed input video signal to said imaging means such that one or more of the non-desirable characteristics are reduced.

2. A display system according to claim 1, wherein the imaging means comprises two or more displays.

3. A display system according to claim 2, wherein the displays are projection displays.

4. A display system according to claim 2, wherein said camera means comprises two or more camera devices, each camera device capturing a capture image of at least a portion of the screen.

5. A display system according to claim 4, wherein each of the two or more camera devices corresponds to at least one of the two or more displays.

6. A display system according to claim 5, wherein one of the two or more camera devices and one of the two or more displays collectively form a display/camera cluster.

7. A display system according to claim 6, wherein the display system comprises an array of display/camera clusters.

8. A display system according to claim 7, wherein each of the display/camera clusters includes at least a portion of said determining means and said processing means.

9. A tiled display system comprising:
   first display means for displaying a first discrete image into a screen;
   second display means for displaying a second discrete image onto the screen, the first and second discrete images forming at least part of a composite image;
   first camera means for capturing a first capture image of a first portion of the composite image;
   second camera means for capturing a second capture image of a second portion of the composite image including at least a portion of the second discrete image;
   determining means coupled to said first and second camera means for determining if the composite image has one or more non-desirable characteristic; and
   processing means coupled to said first and second display means and to said determining means for processing an input video signal and providing a first processed input video signal to said first display means and a second processed input video signal to said second display means such that one or more of the non-desirable characteristics of the composite image are reduced.

10. A tiled display system according to claim 9, wherein the first capture image includes part of the first discrete image and part of the second discrete image.

11. A tiled display system according to claim 10, wherein the second capture image includes part of the first discrete image and part of the second discrete image.

12. A tiled display system according to claim 11, wherein the first discrete image at least partially overlaps the second discrete image.

13. A tiled display system according to claim 9, wherein said processing means includes segmenting means for segmenting the input video signal to provide the first processed input video signal and the second processed input video signal.

14. A tiled display system according to claim 9, wherein said processing means includes identifying means coupled to said determining means for identifying a transformation function that can be used to process the input video signal and provide the first processed input video signal to reduce selected non-desirable characteristics in the composite image.

15. A tiled display system according to claim 14, wherein said first camera means periodically captures a new first capture image during a normal functional operation of the tiled projection display.

16. A tiled display system according to claim 15, wherein said determining means periodically determines if the new first capture image has one or more non-desirable characteristics, and said identifying means periodically identifies a new transformation function that can be used to process the input video signal and provide the first processed input video signal to the first projector means to reduce the one or more non-desirable characteristics in the composite image.

17. A tiled display system according to claim 9, wherein said processing means includes identifying means coupled to said determining means for identifying a first transformation function that can be used to process the input video signal and provide the first processed input video signal, and for identifying a second transformation function that can be used to process the input video signal and provide the second processed input video signal, wherein said first and second processed input video signals collectively reduce selected non-desirable characteristics in the composite image.

18. A tiled display system according to claim 9, wherein each display means has an associated camera means, with the two collectively forming a display/camera cluster.

19. A tiled display system according to claim 18, wherein each display/camera cluster further includes a portion of the processing means.

20. A tiled display system according to claim 9, wherein the one or more non-desirable characteristics includes spatial non-uniformity.

21. A tiled display system according to claim 9, wherein the one or more non-desirable characteristics includes color non-uniformity.

22. A tiled display system according to claim 9, wherein the one or more non-desirable characteristics includes luminance non-uniformity.

23. A tiled display system according to claim 9, wherein said first camera means is a multi-point colorimeter.

24. A tiled display system according to claim 23, wherein the colorimeter comprises one or more CCD's.

25. A tiled display system according to claim 9, wherein the tiled display system is a rear projection display having a transmissive screen that has a projection side and a viewing side, the first and second display means displaying the first and second discrete images onto the projection side of the transmissive screen, and the first and second camera means capturing the first and second capture images from the projection side of the screen.

26. A method for calibrating a rear projection display comprising the steps of:
   providing a screen that has a projection side and a viewing side;
   projecting an image onto the projection side of the screen;
   capturing a capture image of at least a portion of the projection side of the screen;
   determining if the capture image has one or more non-desirable characteristic;
   identifying a transformation function that can be applied to an input video signal to reduce the non-desirable characteristics; and
   processing the input video signal using the transformation to providing a transformed input video signal such that one or more of the non-desirable characteristics are reduced.

27. A method for reducing non-desirable characteristics in a tiled projection display, the method comprising the steps of:

providing a first projector and a second projector;

providing a first camera means and a second camera means;

projecting a first discrete image onto a screen using the first projector;

projecting a second discrete image onto the screen using the second projector, wherein the first and second discrete images form at least part of a composite image;

capturing a first capture image of a first portion of the composite image, including at least a portion of the first discrete image, using said first camera means;

capturing a second capture image of a second portion of the composite image, including at least a portion of the second discrete image, using said second camera means;

determining if the composite image has one or more non-desirable characteristic; and processing an input video signal and providing a first processed input video signal to said first projector means and a second processed input video signal to said second projector means such that one or more of the non-desirable characteristics of the composite image are reduced.

28. A method according to claim 27, wherein the capturing, determining and processing steps are periodically repeated.

29. A method according to claim 27, wherein said processing step includes the steps of:

identifying a first transformation function that can be used to process the input video signal and provide the first processed input video signal to reduce selected nondesirable characteristics in the composite image.

30. A method according to claim 29, wherein said processing step includes the steps of: identifying a second transformation function that can be used to process the input video signal and provide the second processed input video signal to reduce selected non-desirable characteristics in the composite image.

\* \* \* \* \*